United States Patent
Kimura et al.

(10) Patent No.: US 10,647,864 B2
(45) Date of Patent: May 12, 2020

(54) AQUEOUS PIGMENT DISPERSION, AQUEOUS GREEN INK FOR INKJET RECORDING, AND AQUEOUS RED INK FOR INKJET RECORDING

(71) Applicant: DIC Corporation, Tokyo (JP)

(72) Inventors: Toshihisa Kimura, Saitama (JP); Satoru Toida, Saitama (JP)

(73) Assignee: DIC CORPORATION, Tokyo (JP)

( * ) Notice: Subject to any disclaimer, the term of this patent is extended or adjusted under 35 U.S.C. 154(b) by 146 days.

(21) Appl. No.: 15/762,221

(22) PCT Filed: Sep. 27, 2016

(86) PCT No.: PCT/JP2016/078376
§ 371 (c)(1),
(2) Date: Aug. 21, 2018

(87) PCT Pub. No.: WO2017/061301
PCT Pub. Date: Apr. 13, 2017

(65) Prior Publication Data
US 2018/0355198 A1    Dec. 13, 2018

(30) Foreign Application Priority Data

Oct. 8, 2015 (JP) ................. 2015-200233
Oct. 8, 2015 (JP) ................. 2015-200234

(51) Int. Cl.
| | |
|---|---|
| C09D 11/322 | (2014.01) |
| B41M 5/00 | (2006.01) |
| C09D 11/326 | (2014.01) |
| C09D 11/106 | (2014.01) |
| C09D 153/00 | (2006.01) |
| C08F 297/02 | (2006.01) |
| C09B 67/46 | (2006.01) |
| C08F 8/12 | (2006.01) |
| C09D 17/00 | (2006.01) |

(52) U.S. Cl.
CPC ............ *C09D 11/322* (2013.01); *B41M 5/00* (2013.01); *C08F 8/12* (2013.01); *C08F 297/026* (2013.01); *C09B 67/009* (2013.01); *C09D 11/106* (2013.01); *C09D 11/326* (2013.01); *C09D 17/001* (2013.01); *C09D 17/003* (2013.01); *C09D 153/00* (2013.01)

(58) Field of Classification Search
CPC .. C09D 11/322; C09D 153/00; C09D 11/106; C09D 11/326; C09D 17/003; C09D 17/001; C08F 8/12; C08F 297/026; C09B 67/009; B41M 5/00

USPC .................................................. 523/160, 161
See application file for complete search history.

(56) References Cited

U.S. PATENT DOCUMENTS

| | | | | |
|---|---|---|---|---|
| 4,680,387 A | * | 7/1987 | Kranz ................. | C09B 67/0019 540/136 |
| 2014/0011917 A1 | | 1/2014 | Yokoyama et al. | |
| 2014/0363642 A1 | † | 12/2014 | Kawaguchi | |
| 2016/0264799 A1 | † | 9/2016 | Uemura | |

FOREIGN PATENT DOCUMENTS

| | | | |
|---|---|---|---|
| EP | 0 556 649 A1 | * | 8/1993 |
| JP | H10-007955 A | | 1/1998 |
| JP | 2010235742 A | † | 10/2010 |
| JP | 2011237769 A | † | 11/2011 |
| JP | 2012-207106 A | | 10/2012 |
| JP | 2013-000993 A | | 1/2013 |
| JP | 2014-24879 A | | 2/2014 |
| JP | 2014-136709 A | | 7/2014 |
| JP | 2014-181321 A | | 9/2014 |
| JP | 2015-113366 A | | 6/2015 |
| JP | 2015105361 A | † | 6/2015 |
| JP | 2015147888 A | † | 8/2015 |
| WO | 99/05230 A1 | | 2/1999 |
| WO | 2012/115127 A1 | | 8/2012 |
| WO | 2015/072339 A1 | | 5/2015 |

OTHER PUBLICATIONS

International Search Report dated Dec. 13, 2016 issued in International Patent Application No. PCT/JP2016/078376 (with English translation).

* cited by examiner
† cited by third party

*Primary Examiner* — Doris L Lee
(74) *Attorney, Agent, or Firm* — McDermott Will & Emery LLP

(57) ABSTRACT

An object of the present invention is to provide an aqueous pigment dispersion that provides an aqueous ink for inkjet recording that contains a reduced number of coarse particles, is excellent in ejection stability, and is applicable to a printer equipped with a high-resolution inkjet head and to provide the aqueous ink for inkjet recording. The present invention relates to an aqueous pigment dispersion containing: a polymer (A) that has anionic groups, has a solubility in water of 0.1 g/100 mL or less and a number average molecular weight within the range of 1,000 to 6,000, and forms fine particles in water when the degree of neutralization of the anionic groups with a basic compound is 100%; a polyhalogenated metal phthalocyanine pigment or a diketopyrrolopyrrole pigment; and water. The invention also relates to an aqueous ink for inkjet recording.

7 Claims, 1 Drawing Sheet

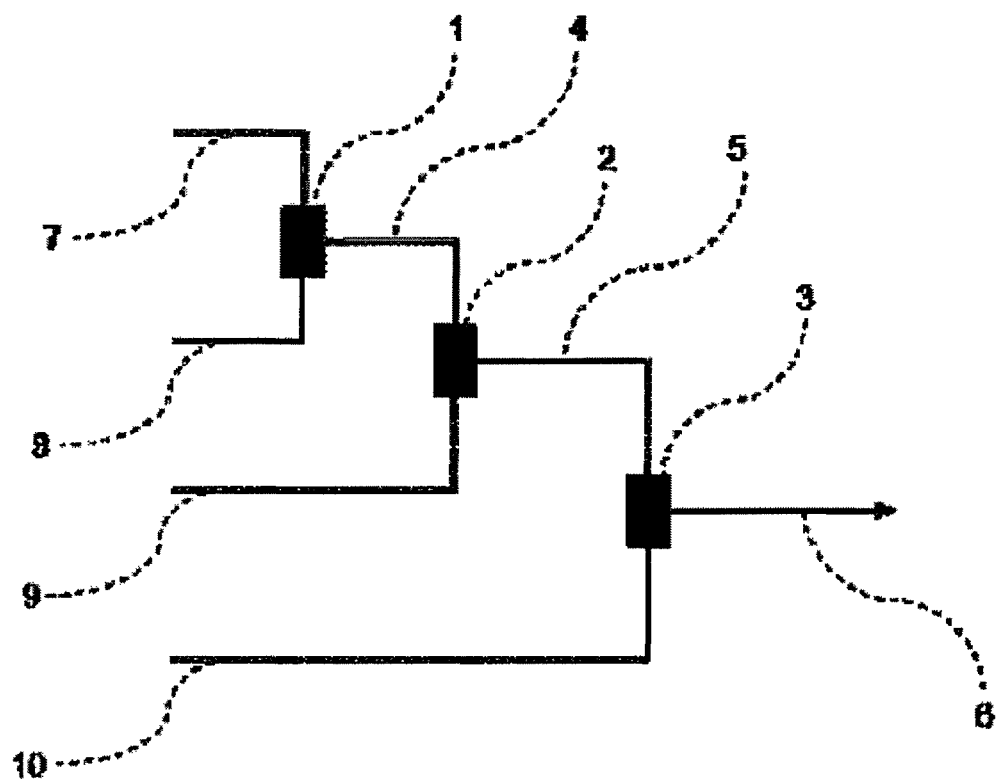

AQUEOUS PIGMENT DISPERSION, AQUEOUS GREEN INK FOR INKJET RECORDING, AND AQUEOUS RED INK FOR INKJET RECORDING

RELATED APPLICATIONS

This application is the U.S. National Phase under 35 U.S.C. § 371 of International Application No. PCT/JP2016/078376, filed on Sep. 27, 2016 which in turn claims the benefit of Japanese Patent Application No. 2015-200233, filed on Oct. 8, 2015 and Japanese Patent Application No. 2015-200234 filed on Oct. 8, 2015, the disclosures of which applications are incorporated by reference herein.

TECHNICAL FIELD

The present invention relates to an aqueous pigment dispersion, to an aqueous green ink for inkjet recording that uses the aqueous pigment dispersion, and to an aqueous red ink for inkjet recording that uses the aqueous pigment dispersion.

BACKGROUND ART

Pigment compositions use pigments having excellent light fastness as coloring materials. Utilization of the excellent light fastness of the pigments allows the pigment compositions to be used in various indoor and outdoor applications such as the field of coatings for automobiles and buildings, the field of printing inks such as offset inks, gravure inks, flexographic inks, and silk screen inks, and the field of aqueous inks for inkjet recording.

In particular, aqueous inks that use water as their main solvent have an advantageous feature in that the risk of fire, which is high for solvent inks, can be further reduced. The aqueous inks are the mainstream of inks particularly for inkjet recording.

A pigment is insoluble in water and is used for an aqueous pigment dispersion prepared by dispersing the pigment in an aqueous medium. Accordingly, methods for stably dispersing a pigment in an aqueous medium have been studied.

For example, in one known method, an (An-Bm) block copolymer is used as a pigment dispersant. The (An-Bm) block copolymer is an A-B block copolymer, wherein A is styrene, and B is acrylic acid. The degree of polymerization of A is about 5 to about 50, and the degree of polymerization of B is about 70 to about 800 (see, for example, PTL 1).

One challenge of an aqueous pigment dispersion is to reduce the number of coarse particles that may be formed during dispersion. The coarse particles are particles having diameters much larger than the average particle diameter of the aqueous pigment dispersion obtained and may be aggregates of undispersed particles of the pigment and debris of the pigment formed during dispersion or aggregates of the polymer used as a pigment dispersant.

The coarse particles inhibit the formation of a uniform coating surface during coating or printing. In a printing method in which an ink such as an aqueous ink for inkjet recording is ejected from nozzles of an inkjet head, the coarse particles cause clogging of the nozzles. In particular, since the resolution of inkjet printers is increasing in recent years, the density of nozzles of inkjet heads is increasing, and the size of liquid droplets is decreasing. In other words, the diameter of the nozzles for ejecting the ink is decreasing, and the degree of integration of the nozzles is increasing (see, for example, PTL 2). As the diameter of the nozzles decreases, the allowable size of foreign matter decreases, and this causes an increase in the frequency of occurrence of clogging of the nozzles. Specifically, a problem occurs in that inks applicable to conventional inkjet printers cannot be used for a printer equipped with a newly developed high-resolution inkjet head.

In order to provide an ink that can cope with a reduction in the diameter of nozzles and an increase in their degree of integration in recent years, there is still room for consideration. In view of the above, the present applicant has developed and disclosed an aqueous pigment dispersion used to provide an aqueous ink for inkjet recording that contains a reduced number of coarse particles, is excellent in ejection stability, and is applicable to a printer equipped with a high-resolution inkjet head (see PTL 3).

Aqueous inks for inkjet recording are used as basic color inks including yellow, magenta, cyan, and black inks, and these basic color inks are often used in combination with, for example, an aqueous green, red, blue, or orange ink called an extra color ink. Known examples of a green pigment include polyhalogenated metal phthalocyanines such as C.I. Pigment Green 36 and C.I. Pigment Green 7 (see, for example, PTL 4). Known examples of red and orange pigments include diketopyrrolopyrrole pigments (see, for example, PTL 5 to PTL 7).

However, the polyhalogenated metal phthalocyanine pigments and the diketopyrrolopyrrole pigments have larger specific gravities and larger primary particle diameters than pigments used for the basic colors such as cyan and therefore tend to sediment, so that it is sometimes difficult to obtain dispersion stability comparable to that of the basic color pigment dispersions.

The dispersion stability of a pigment often depends on the interaction between the type of the pigment and a dispersant resin. Therefore, even when a dispersant resin used for a basic color pigment dispersion is used in combination with an extra color pigment, it is not always possible to readily obtain good dispersion stability. In order to improve the dispersion stability of extra color pigments, those skilled in the art may need considerable trial and error.

CITATION LIST

Patent Literature

PTL 1: Japanese Unexamined Patent Application Publication No. 10-007955
PTL 2: Japanese Unexamined Patent Application Publication No. 2013-000993
PTL 3: International Publication No. WO2015/072339
PTL 4: International Publication No. WO99/05230
PTL 5: Japanese Unexamined Patent Application Publication No. 2015-113366
PTL 6: Japanese Unexamined Patent Application Publication No. 2014-136709
PTL 7: Japanese Unexamined Patent Application Publication No. 2012-207106

SUMMARY OF INVENTION

Technical Problem

An object of the invention is to provide an aqueous pigment dispersion capable of providing an aqueous green or red ink for inkjet recording that contains a reduced number of coarse particles, is excellent in ejection stability, and is applicable to, for example, a printer equipped with a high-resolution inkjet head and to provide aqueous green and red inks for inkjet recording that use the aqueous pigment dispersion.

Solution to Problem

The present invention relates to an aqueous pigment dispersion comprising: a polymer (A) that has anionic groups, has a solubility in water of 0.1 g/100 mL or less and a number average molecular weight within the range of 1,000 to 6,000, and forms fine particles in water when the degree of neutralization of the anionic groups with a basic compound is 100%; a polyhalogenated metal phthalocyanine pigment or a diketopyrrolopyrrole pigment; and water.

The present invention also relates to an aqueous green ink for inkjet recording and an aqueous red ink for inkjet recording that contain the aqueous pigment dispersion.

Advantageous Effects of Invention

According to the present invention, green and red aqueous pigment dispersions that contain a reduced number of coarse particles and are excellent in ejection stability, an aqueous green ink for inkjet recording, and an aqueous red ink for inkjet recording can be obtained.

DESCRIPTION OF EMBODIMENTS (Polymer (A))

The polymer (A) used in the present invention has a solubility in water of 0.1 g/100 mL or less and a number average molecular weight within the range of 1,000 to 6,000 and forms fine particles in water when the degree of neutralization of the anionic groups with a basic compound is 100%.

(Solubility in Water)

In the present invention, the solubility of the polymer (A) in water is defined as follows. Specifically, 0.5 g of the polymer screened using sieves with mesh sizes of 250 μm and 90 μm so that its particle diameter falls within the range of 250 μm to 90 μm is sealed in a bag produced from a 400-mesh wire net, immersed in 50 mL of water, and left under mild stirring at a temperature of 25° C. for 24 hours. After immersion for 24 hours, the 400-mesh wire net with the polymer sealed therein is dried in a dryer set at 110° C. for 2 hours to dry the polymer. The change in weight of the 400-mesh wire net with the polymer sealed therein before and after immersion in water is measured, and the solubility is computed using the following formula.

Solubility (g/100 mL)=(polymer-sealed 400-mesh wire net before immersion (g)−polymer-sealed 400-mesh wire net after immersion (g))×2      [Math. 1]

(Fine Particles)

In the present invention, whether or not fine particles are formed in water when the degree of neutralization of the anionic groups with the basic compound is 100% is determined as follows.

(1) The acid value of the polymer is measured in advance using an acid value measurement method according to JIS test method K 0070-1992. Specifically, 0.5 g of the polymer is dissolved in a tetrahydrofuran (hereinafter may be referred to as THF) solvent, and titration with a 0.1M alcoholic potassium hydroxide solution is performed using phenolphthalein as an indicator to determine the acid value.

(2) 1 g of the polymer is added to 50 mL of water, and a 0.1 mol/L aqueous potassium hydroxide solution is added in an amount sufficient to completely neutralize the polymer with the above-determined acid value to thereby obtain a completely neutralized polymer.

(3) The completely neutralized solution is subjected to ultrasonic waves at a temperature of 25° C. for 2 hours using an ultrasonic cleaner (ultrasonic cleaner US-102, SND Co., Ltd., 38 kHz, self-excited oscillation) and is then left to stand at room temperature for 24 hours.

After the solution has been left to stand for 24 hours, a sample solution is sampled at a depth of 2 cm from the surface of the solution. Then, using a dynamic light scattering particle diameter distribution measurement device (dynamic light scattering particle diameter measurement device "Microtrac particle size distribution analyzer UPA-ST150" manufactured by NIKKISO Co., Ltd.), a determination is made as to whether or not information about light scattering due to formation of fine particles is obtained, whereby the presence or absence of fine particles is checked.

(Diameter of Fine Particles)

To further improve the stability in water of the fine particles formed from the polymer (A) used in the present invention, the diameter of the fine particles is preferably within the range of 5 to 1,000 nm, more preferably within the range of 7 to 700 nm, and most preferably within the range of 10 to 500 nm. As the particle size distribution of the fine particles becomes narrower, the fine particles tend to exhibit better dispersion stability. However, even when the particle size distribution is wide, a pigment dispersion having better dispersion stability than conventional pigment dispersions can be obtained. The particle diameter and the particle size distribution are measured using a dynamic light scattering particle diameter distribution measurement device (dynamic light scattering particle diameter measurement device "Microtrac particle size distribution analyzer UPA-ST150" manufactured by NIKKISO Co., Ltd.) in the same manner as in the determination method for the fine particles described above.

(Degree of Neutralization of Polymer (A))

The degree of neutralization of the polymer (A) used in the present invention is determined using the following formula.

Degree of neutralization (%)=((mass (g) of basic compound)×56×1,000)/(acid value (mg KOH/g) of polymer (A)×number of equivalents of basic compound×mass (g) of polymer (A))×100      [Math. 2]

The acid value of the polymer (A) is measured according to JIS test method K 0070-1992. Specifically, 0.5 g of a sample is dissolved in a THF solvent, and titration with a 0.1M alcoholic potassium hydroxide solution is performed using phenolphthalein as an indicator to determine the acid value.

(Number Average Molecular Weight of Polymer (A))

The number average molecular weight of the polymer (A) used in the present invention is 1,000 to 6,000. As described above, the polymer (A) has a low solubility in water, i.e., 0.1 g/100 mL or less. Therefore, if the polymer (A) has an excessively large molecular weight, a precipitate may be formed when the polymer (A) is dispersed in water even though the polymer (A) has been neutralized with the basic compound. Moreover, the penetrability of the polymer (A) into pigment aggregates becomes low, and its ability to disintegrate the pigment aggregates tends to become low, so that the pigment may not be dispersed easily in water.

If a polymer with a number average molecular weight of less than 1,000 is used, the stability of an aqueous pigment dispersion to be obtained may deteriorate.

The polyhalogenated metal phthalocyanine pigment or the diketopyrrolopyrrole pigment is more difficult to disperse than general pigments used for basic color (cyan, magenta, yellow, and black) inks. Therefore, when the above specific pigment is used in combination with a polymer having a number average molecular weight outside the range of 1,000 to 6,000, the number of coarse particles may not be reduced to a level comparable to that in the basic color pigment dispersions, and an aqueous pigment dispersion and an ink that are excellent in ejection stability and pigment dispersion stability may not be obtained.

Therefore, preferably, the polymer (A) used in the present application has a small number average molecular weight within the above range. More preferably, a polymer with a number average molecular weight of 1,300 to 5,000 is used. When a polymer with a number average molecular weight of 1,500 to 4,500 is used in combination with the polyhalogenated metal phthalocyanine pigment or the diketopyrrolopyrrole pigment, sedimentation of the polyhalogenated metal phthalocyanine pigment or the diketopyrrolopyrrole pigment is unlikely to occur, and the number of coarse particles can be reduced to a level comparable to that in the basic color pigment dispersions.

Therefore, very high pigment dispersibility and ejection stability can be imparted.

The number average molecular weight is a polystyrene-equivalent value measured by GPC (gel permeation chromatography) and is specifically a value measured under the conditions described below.

(Method for Measuring Number Average Molecular Weight (Mn))

The measurement is performed by gel permeation chromatography (GPC) under the following conditions.

Measurement device: High performance GPC ("HLC-8220GPC" manufactured by TOSOH Corporation)

Columns: The following columns manufactured by TOSOH Corporation are connected in series and used.

"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1

Detector: RI (refractive index detector)
Column temperature: 40° C.
Eluent: Tetrahydrofuran (THF)
Flow rate: 1.0 mL/min
Injection amount: 100 µL (THF solution with a sample concentration of 0.4% by mass)
Standard samples: The following polystyrene standards are used to produce a calibration curve.

(Polystyrene Standards)

"TSKgel standard polystyrene A-500" manufactured by TOSOH Corporation
"TSKgel standard polystyrene A-1000" manufactured by TOSOH Corporation
"TSKgel standard polystyrene A-2500" manufactured by TOSOH Corporation
"TSKgel standard polystyrene A-5000" manufactured by TOSOH Corporation
"TSKgel standard polystyrene F-1" manufactured by TOSOH Corporation
"TSKgel standard polystyrene F-2" manufactured by TOSOH Corporation
"TSKgel standard polystyrene F-4" manufactured by TOSOH Corporation
"TSKgel standard polystyrene F-10" manufactured by TOSOH Corporation
"TSKgel standard polystyrene F-20" manufactured by TOSOH Corporation
"TSKgel standard polystyrene F-40" manufactured by TOSOH Corporation
"TSKgel standard polystyrene F-80" manufactured by TOSOH Corporation
"TSKgel standard polystyrene F-128" manufactured by TOSOH Corporation
"TSKgel standard polystyrene F-288" manufactured by TOSOH Corporation
"TSKgel standard polystyrene F-550" manufactured by TOSOH Corporation (Surface Tension)

An aqueous resin dispersion containing the polymer (A) used in the present invention can have a surface tension of 70 dyn/cm, which is close to the surface tension of water. It is expected that the higher the surface tension of the polymer (A), the more easily the surface tension of the pigment dispersion obtained can be maintained at a certain level or higher.

When a water-soluble polymer that does not form fine particles even when the degree of neutralization of anionic groups with the basic compound is 100% is used instead of the polymer (A), the surface tension of an aqueous solution of the polymer tends to be very low.

The surface tension of the polymer (A) using the polymer (A) is preferably 30 dyn/cm or more and more preferably 40 dyn/cm or more. The surface tension is a value measured on a completely neutralized polymer solution prepared by adding 1 g of the polymer (A) having the acid value determined above and then adding a 0.1 mol/L aqueous potassium hydroxide solution in an amount sufficient to completely neutralize the polymer.

No particular limitation is imposed on the polymer (A), so long as it is a polymer which, as described above, is insoluble or poorly soluble in water used as a main solvent of the pigment dispersion when not neutralized, forms fine particles when completely neutralized, and contains, in addition to the hydrophilic anionic groups, hydrophobic groups in its molecule.

Examples of such a polymer (A) include a block copolymer including a polymer block having hydrophobic groups and a polymer block having anionic groups. However, although the polymer (A) is a block polymer, if the polymer has a solubility in water of more than 0.1 g/100 mL or does not form fine particles when the degree of neutralization of the anionic groups with the basic compound is 100%, the effects of the present invention are not obtained.

The number of hydrophobic groups and the number of anionic groups are as follows. If the number of anionic groups is excessively large, it is highly probable that the solubility in water exceeds 0.1 g/100 mL or fine particles are not formed when the degree of neutralization of the anionic groups with the basic compound is 100%. From this point of view, it is preferable that the number of anionic groups is not so large. In the polymer, the number of anionic groups and the solubility in water are not necessarily determined by the acid value of the polymer and the number of anionic groups in the design phase of the polymer. For example, among polymers having the same acid value, a polymer having a low molecular weight tends to have a high solubility in water, and a polymer having a high molecular weight tends to have a low solubility in water. Therefore, in the present invention, the polymer (A) is specified by its solubility in water.

The polymer (A) may be a homopolymer but is preferably a copolymer. The polymer (A) may be a random polymer, a block polymer, or an alternating polymer but is preferably a block polymer. The polymer may be a branched polymer but is preferably a linear polymer.

It is preferable in terms of design flexibility that the polymer (A) is a vinyl polymer. To produce a vinyl polymer having the molecular weight and solubility characteristics desired in the present invention, it is preferable to use a production method using "living polymerization" such as living radical polymerization, living cationic polymerization, or living anionic polymerization.

In particular, it is preferable that the polymer (A) is a vinyl polymer produced using a (meth)acrylate monomer as one of the raw materials. The method for producing such a vinyl polymer is preferably living radical polymerization or living anionic polymerization. Living anionic polymerization is preferred from the viewpoint that the molecular weight of the block polymer and its segments can be more precisely designed.

(Polymer (A) Produced by Living Anionic Polymerization)

Specifically, the polymer (A) produced by living anionic polymerization is a polymer represented by general formula (1).

[Chem. 1]

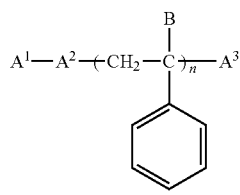
(1)

In formula (1), $A^1$ represents an organic lithium initiator residue, $A^2$ represents a polymer block of a monomer having an aromatic ring or a heterocycle, and A' is a polymer block having anionic groups. n represents an integer of 1 to 5, and B represents an aromatic group or an alkyl group.

In general formula (1), $A^1$ represents an organic lithium initiator residue. Specific examples of the organic lithium initiator include: alkyllithiums such as methyllithium, ethyllithium, propyllithium, butyllithium (n-butyllithium, sec-butyllithium, iso-butyllithium, and tert-butyllithium), pentyllithium, hexyllithium, methoxymethyllithium, and ethoxymethyllithium; phenylalkylenelithiums such as benzyllithium, α-methylstyryllithium, 1,1-diphenyl-3-methylpentyllithium, 1,1-diphenylhexyllithium, and phenylethyllithium; alkenyllithiums such as vinyllithium, allyllithium, propenyllithium, and butenyllithium; alkynyllithiums such as ethynyllithium, butynyllithium, pentynyllithium, and hexynyllithium; aryllithiums such as phenyllithium and naphthyllithium; heterocyclic lithiums such as 2-thienyllithium, 4-pyridyllithium, and 2-quinolyllithium; and alkyllithium-magnesium complexes such as tri(n-butyl)magnesium lithium and trimethylmagnesium lithium.

Examples of the monomer having an aromatic ring include: styrene-based monomers such as styrene, p-tert-butyldimethylsiloxystyrene, o-methylstyrene, p-methylstyrene, p-tert-butylstyrene, p-tert-butoxystyrene, m-tert-butoxystyrene, p-tert-(1-ethoxymethyl)styrene, m-chlorostyrene, p-chlorostyrene, p-fluorostyrene, α-methylstyrene, and p-methyl-α-methylstyrene; vinylnaphthalene; and vinylanthracene.

Examples of the monomer having a heterocycle include vinylpyridine-based monomers such as 2-vinylpyridine and 4-vinylpyridine.

These monomers may be used alone or as a mixture of two or more types.

In the polymer (A) used, the number of repeat units originating from the aromatic ring- or heterocycle-containing monomer forming $A^2$ in general formula (1) above is preferably within the range of 5 to 40 and more preferably within the range of 6 to 30. Particularly preferably, a polymer (A) in which the number of repeat units is within the range of 7 to 25 is used in combination with the polyhalogenated metal phthalocyanine pigment or the diketopyrrolopyrrole pigment. This is because sedimentation of the pigment is unlikely to occur and the number of coarse particles can be reduced to a level comparable to that in the basic color pigment dispersions. In this case, very high pigment dispersibility and ejection stability can be imparted.

In the polymer (A), the number of anionic groups present in the polymer block represented by $A^3$ in general formula (1) above and containing the anionic groups is preferably within the range of 3 to 20, more preferably within the range of 4 to 17, and most preferably 5 to 15. When the polymer (A) in which the number of anionic groups is within the above range is used in combination with the polyhalogenated metal phthalocyanine pigment or the diketopyrrolopyrrole pigment, sedimentation of the pigment is unlikely to occur, and the number of coarse particles can be reduced to a level comparable to that in the basic color pigment dispersions. In this case, very high pigment dispersibility and ejection stability can be imparted.

In general formula (1) above, $A^3$ represents the polymer block having anionic groups. $A^3$ is used for the purpose of imparting appropriate solubility as described above and for the purpose of imparting dispersion stability in water when a pigment dispersion is formed.

Examples of the anionic group in the polymer block $A^3$ include a carboxyl group, a sulfonic acid group, and a phosphoric acid group. Of these, a carboxyl group is preferred because of the ease of preparation, a wide choice of monomer types, and availability. Two carboxyl groups in the same molecule or different molecules may undergo dehydration condensation to thereby form an acid anhydride group.

No particular limitation is imposed on the method for introducing the anionic groups into $A^3$. For example, when the anionic groups are carboxyl groups, $A^3$ may be a homopolymer or copolymer block (PB1) obtained by homopolymerization of (meth)acrylic acid or copolymerization of (meth)acrylic acid with another monomer or may be a polymer block (PB2) obtained by homopolymerizing a (meth)acrylate having a protecting group that can be reconverted into an anionic group by deprotection or copolymerizing this (meth)acrylate with another monomer to obtain a homopolymer or a copolymer and then reconverting some or all of the protecting groups that can be reconverted into anionic groups into the anionic groups.

The (meth)acrylic acid used for the polymer block $A^3$ is a generic term for acrylic acid and methacrylic acid, and the (meth)acrylate is a generic term for acrylate and methacrylate.

Specific examples of the (meth)acrylic acid and (meth)acrylate include (meth)acrylic acid, methyl (meth)acrylate, ethyl (meth)acrylate, iso-propyl (meth)acrylate, allyl (meth)acrylate, n-butyl (meth)acrylate, iso-butyl (meth)acrylate, sec-butyl (meth)acrylate, tert-butyl (meth)acrylate, n-amyl (meth)acrylate, iso-amyl (meth)acrylate, n-hexyl (meth)acrylate, n-octyl (meth)acrylate, 2-ethylhexyl (meth)acrylate, n-lauryl (meth)acrylate, n-tridecyl (meth) acrylate, n-stearyl (meth)acrylate, phenyl (meth)acrylate, benzyl (meth)acrylate, cyclohexyl (meth)acrylate, 4-tert-butylcyclohexyl (meth) acrylate, isobornyl (meth) acrylate, tricyclodecanyl (meth) acrylate, dicyclopentadienyl (meth) acrylate, adamantyl (meth) acrylate, glycidyl (meth) acrylate, tetrahydrofurfuryl (meth)acrylate, 2-methoxyethyl (meth) acrylate, 2-ethoxyethyl (meth) acrylate, dimethylaminoethyl (meth) acrylate, diethylaminoethyl (meth) acrylate, trifluoroethyl (meth) acrylate, tetrafluoropropyl (meth) acrylate, pentafluoropropyl (meth) acrylate, octafluoropentyl (meth) acrylate, pentadecafluorooctyl (meth)acrylate, heptadecafluorodecyl (meth) acrylate, N,N-dimethyl(meth) acrylamide, (meth) acryloylmorpholine, (meth)acrylonitrile, and polyalkylene oxide group-containing (meth)acrylates such as polyethylene glycol (meth)acrylate, polypropylene glycol (meth)acrylate, polyethylene glycol-polypropylene glycol (meth)acrylate, polyethylene glycol-polybutylene glycol (meth)acrylate, polypropylene glycol-polybutylene glycol (meth) acrylate, methoxypolyethylene glycol (meth)acrylate, ethoxypolyethylene glycol (meth) acrylate, butoxypolyethylene glycol (meth) acrylate, octoxypolyethylene glycol (meth) acrylate, lauroxypolyethylene glycol (meth) acrylate, stearoxypolyethylene glycol (meth) acrylate, phenoxypolyethylene glycol (meth) acrylate, methoxypolypropylene glycol (meth) acrylate, and octoxypolyethylene glycol-polypropylene glycol (meth)acrylate. These monomers may be used alone or as a mixture of two or more types.

In the living anionic polymerization method, when the monomer used is a monomer having an active proton-containing group such as an anionic group, the active end of the living anionic polymerized polymer immediately reacts with the active proton-containing group and is thereby deactivated, so that no polymer is obtained. In living anionic polymerization, it is difficult to polymerize a monomer having an active proton-containing group without any treatment. It is therefore preferable to perform polymerization with the active proton-containing group protected and then perform deprotection to reconvert the protecting group into the active proton-containing group.

For this reason, it is preferable that a monomer containing a (meth)acrylate having a protecting group that can be reconverted into an anionic group by deprotection is used for the polymer block $A^3$. The use of such a monomer for the polymerization described above can prevent inhibition of the polymerization. The anionic group protected by the protecting group can be reconverted into the anionic group by deprotection after a block copolymer is obtained.

For example, when the anionic group is a carboxyl group, the carboxyl group is esterified. In a subsequent step, deprotection is performed through hydrolysis etc., and the esterified group can thereby be reconverted into the carboxyl group. In this case, the protecting group that can be converted into a carboxyl group is preferably a group having an ester bond, and examples of such a group include: primary alkoxycarbonyl groups such as a methoxycarbonyl group, an ethoxycarbonyl group, a n-propoxycarbonyl group, and a n-butoxycarbonyl group; secondary alkoxycarbonyl groups such as an isopropoxycarbonyl group and a sec-butoxycarbonyl group; tertiary alkoxycarbonyl groups such as a t-butoxycarbonyl group; phenylalkoxycarbonyl groups such as a benzyloxycarbonyl group; and alkoxyalkylcarbonyl groups such as an ethoxyethylcarbonyl group.

Examples of the monomer that can be used when the anionic group is a carboxyl group include: alkyl (meth) acrylates such as methyl (meth)acrylate, ethyl (meth)acrylate, n-propyl (meth)acrylate, isopropyl (meth)acrylate, n-butyl (meth)acrylate, sec-butyl (meth)acrylate, isobutyl (meth)acrylate, t-butyl (meth)acrylate, 2-ethylhexyl (meth) acrylate, decyl (meth)acrylate, undecyl (meth)acrylate, dodecyl (meth)acrylate (lauryl (meth)acrylate), tridecyl (meth) acrylate, pentadecyl (meth) acrylate, hexadecyl (meth) acrylate, heptadecyl (meth) acrylate, octadecyl (meth)acrylate (stearyl (meth)acrylate), nonadecyl (meth) acrylate, and icosanyl (meth)acrylate; phenylalkylene (meth)acrylates such as benzyl (meth)acrylate; and alkoxyalkyl (meth)acrylates such as ethoxyethyl (meth)acrylate. One type of these (meth)acrylates may be used, or a combination of two or more types may be used. Among these (meth)acrylates, t-butyl (meth)acrylate and benzyl (meth) acrylate are preferably used because their conversion reaction into a carboxyl group can be easily performed. In view of industrial availability, t-butyl (meth)acrylate is more preferred.

In general formula (1), B represents an aromatic group or an alkyl group having 1 to 10 carbon atoms. n represents an integer of 1 to 5.

In the living anionic polymerization method, direct polymerization of a (meth)acrylate monomer at the active end of a highly nucleophilic styrene-based polymer may not proceed because of nucleophilic attack to carbonyl carbon, so that the (meth)acrylate monomer is not polymerized. Therefore, when the (meth)acrylate monomer is polymerized to the $A^1$-$A^2$ described above, a reaction control agent is used to control the nucleophilicity of the styrene-based polymer, and then the (meth)acrylate monomer is polymerized. B in general formula (1) is a group originating from the reaction control agent. Specific examples of the reaction control agent include diphenylethylene, α-methylstyrene, and p-methyl-α-methylstyrene.

(Living Anionic Polymerization Using Microreactor)

The living anionic polymerization method can be performed as a batch process used for conventional free radical polymerization by controlling the reaction conditions. A method in which a microreactor is used to perform polymerization continuously can also be used. The microreactor allows a polymerization initiator and a monomer to be mixed well, so that the reaction starts simultaneously in the microreactor. In addition, temperature is uniform within the microreactor, and a uniform polymerization rate is achieved, so that the polymer produced can have a narrow molecular weight distribution. Moreover, it is easy to produce a block copolymer in which the components of the blocks are not mixed with each other because their growing ends are stable. Since the reaction temperature is well controlled, side reactions can be easily prevented.

A general method of living anionic polymerization using the microreactor will be described with reference to FIG. 1 showing a schematic diagram of the microreactor.

A first monomer and a polymerization initiator for initiating polymerization are introduced from tube reactors P1 and P2 (7 and 8 in FIG. 1) into a T-shaped micromixer M1 (1 in FIG. 1) including a flow passage in which a plurality of liquids can be mixed, and the first monomer is subjected to living anionic polymerization in the T-shaped micromixer M1 to thereby form a first polymer (step 1).

Next, the first polymer obtained is transferred to a T-shaped micromixer M2 (2 in FIG. 1). In the micromixer M2, a reaction control agent introduced from a tube reactor P3 (9 in FIG. 1) is caused to react with the growing end of the polymer obtained to thereby control the reaction (step 2).

In this case, the value of n in general formula (1) above can be controlled by the type and amount of the reaction control agent used.

Next, the first polymer subjected to reaction control in the T-shaped micromixer M2 is transferred to a T-shaped micromixer M3 (3 in FIG. 3), and a second monomer introduced from a tube reactor P4 and the first polymer subjected to reaction control are subjected to living anionic polymerization continuously in the mixer M3 (step 3).

Then the reaction is quenched with an active proton-containing compound such as methanol, and a block copolymer is thereby produced.

When the polymer (A) in the present invention represented by general formula (1) is produced using the microreactor described above, a monomer having an aromatic ring or a heterocycle is used as the first monomer, and an organic lithium initiator is used as the initiator to initiate the reaction, whereby a polymer block of the monomer having an aromatic ring or a heterocycle, i.e., $A^2$ described above, (an organic group, i.e., the organic lithium initiator residue $A^1$, is bonded to one end of the polymer block $A^2$) is obtained.

Next, the reaction control agent is used to control the reactivity of the growing end. Then a monomer containing a (meth)acrylate having a protecting group that can be reconverted into the anionic group is used as the second monomer and allowed to react to thereby obtain a polymer block.

Then a deprotection reaction such as hydrolysis is performed to reconvert the protecting groups into the anionic groups, and A' described above, i.e., a polymer block having the anionic groups, is thereby obtained.

A detailed description will be given of the method for reconverting an ester bond in the protecting group that can be reconverted into the anionic group into the anionic group by a deprotection reaction such as hydrolysis.

The hydrolysis reaction of the ester bond proceeds under acidic conditions as well as under basic conditions, but the conditions vary slightly depending on the type of ester bond-containing group. For example, when the ester bond-containing group is a primary alkoxycarbonyl group such as a methoxycarbonyl group or a secondary alkoxycarbonyl group such as an isopropoxycarbonyl group, a carboxyl group can be obtained by hydrolysis under basic conditions. Examples of the basic compound used to form the basic conditions in this case include metal hydroxides such as sodium hydroxide and potassium hydroxide.

When the ester bond-containing group is a tertiary alkoxycarbonyl group such as a t-butoxycarbonyl group, a carboxyl group can be obtained by hydrolysis under acidic conditions. Examples of the acidic compound used to form the acidic conditions in this case include: mineral acids such as hydrochloric acid, sulfuric acid, and phosphoric acid; Bronsted acids such as trifluoroacetic acid; and Lewis acids such as trimethylsilyl triflate. The reaction conditions for hydrolysis of a t-butoxycarbonyl group under acidic conditions are disclosed in, for example, "Yukikagobutsu-no-gosei-IV (Synthesis of Organic Compounds IV), Nihon-kagakukai-hen-dai-5-han Jikken-kagaku-koza-16 (the Fifth Series of Experimental Chemistry Vol. 16, Ed. by the Chemical Society of Japan)."

Another example of the method for converting the t-butoxycarbonyl group into a carboxyl group is a method in which a cation exchange resin is used instead of the acid described above. Examples of the cation exchange resin include resins having, in their polymer side chains, acid groups such as carboxyl groups (—COOH) and sulfo groups (—SO$_3$H). Of these, a strongly acidic cation exchange resin having sulfo groups in its side chains is preferable because the rate of the reaction can be increased. Examples of the commercial product of the cation exchange resin that can be used in the present invention include strongly acidic cation exchange resin "Amberlite" manufactured by Organo Corporation. The amount of the cation exchange resin used is preferably within the range of 5 to 200 parts by mass and more preferably within the range of 10 to 100 parts by mass based on 100 parts by mass of the polymer represented by general formula (1) above. This is because hydrolysis can be performed effectively.

When the ester bond-containing group is a phenylalkoxycarbonyl group such as a benzyloxycarbonyl group, the phenylalkoxycarbonyl group can be converted into a carboxyl group through a hydrogenation reduction reaction. In this case, the phenylalkoxycarbonyl group can be reconverted into a carboxyl group quantitatively by performing the reaction using hydrogen gas as a reducing agent in the presence of a palladium catalyst such as palladium acetate under the reaction condition of room temperature.

As described above, the reaction conditions for conversion into a carboxyl group vary depending on the type of ester bond-containing group. For example, a polymer obtained by copolymerization using t-butyl (meth)acrylate and n-butyl (meth)acrylate as raw materials of $A^3$ has t-butoxycarbonyl groups and n-butoxycarbonyl groups. Under the acidic conditions under which the t-butoxycarbonyl groups are hydrolyzed, the n-butoxycarbonyl groups are not hydrolyzed, so that only the t-butoxycarbonyl groups can be selectively hydrolyzed and converted into carboxyl groups through deprotection. Therefore, the acid value of the hydrophilic block ($A^3$) can be controlled by selecting, as raw material monomers of $A^3$, appropriate monomers each containing a (meth)acrylate having a protecting group that can be reconverted into an anionic group.

It is advantageous in terms of the stability of an aqueous pigment dispersion to be obtained that, in the polymer (A) represented by general formula (1) above, the polymer block ($A^2$) and the polymer block ($A^3$) are distinctly separated from each other. The molar ratio of the polymer block ($A^2$) to the polymer block ($A^3$), $A^2:A^3$, is preferably within the range of 100:10 to 100:500. If the ratio of $A^3$ to $A^2$ is less than 10/100, the dispersion stability of the pigment and the ejection stability during inkjet ejection tend to deteriorate. If the ratio of $A^3$ to $A^2$ exceeds 500/100, the hydrophilicity of the polymer becomes excessively high. In this case, when paper, for example, is used as a recording medium, the ink easily permeates the recording medium, and this causes deterioration in color development. In particular, the ratio $A^2:A^3$ is preferably 100:10 to 100:450.

In the polymer (A) represented by general formula (1) above, the number of units of the monomer having an aromatic ring or a heterocycle and forming the polymer block ($A^2$) is preferably within the range of 5 to 40, more preferably within the range of 6 to 30, and most preferably within the range of 7 to 25. The number of anionic groups included in the polymer block ($A^3$) is preferably within the range of 3 to 20, more preferably within the range of 4 to 17, and most preferably within the range of 5 to 15.

When the molar ratio of the polymer block ($A^2$) to the polymer block ($A^3$), $A^2:A^3$, is represented by the molar ratio of the number of moles of the aromatic rings or heterocycles included in the polymer block ($A^2$) to the number of moles of the anionic groups included in ($A^3$), this ratio is preferably 100:7.5 to 100:400.

The acid value of the polymer (A) represented by general formula (1) above is preferably 40 to 400 mg KOH/g, more preferably 40 to 300 mg KOH/g, and most preferably 40 to 190 mg KOH/g. If the acid value is less than 40 mg KOH/g, the dispersion stability of the pigment and the ejection stability during inkjet ejection may be insufficient. If the acid value exceeds 400 mg KOH/g, the hydrophilicity of the polymer increases, and the ink easily permeates a recording medium, so that color development deteriorates. When the acid value exceeds 190 mg KOH/g, the water resistance of the ink obtained is affected in some cases.

The acid value of the polymer (A) is measured by the same acid value measurement method as that for the fine particles of the polymer (A).

(Basic Compound (Neutralizer))

In the aqueous pigment dispersion of the present invention, it is preferable that the anionic groups in the polymer (A) are neutralized.

Any well-known and commonly used basic compound can be used as the basic compound for neutralizing the anionic groups in the polymer (A). For example, inorganic basic materials such as alkali metal hydroxides, e.g., sodium hydroxide and potassium hydroxide, and organic basic compounds such as ammonia, triethylamine, and alkanolamine can be used.

As for the degree of neutralization of the anionic groups present in the polymer (A) in the aqueous pigment dispersion with the basic compound, it is not necessary that the anionic groups present in the polymer (A) be completely neutralized. Specifically, the anionic groups present in the polymer (A) are neutralized such that the degree of neutralization is preferably 20% to 200% and more preferably 80% to 150%.

(Polyhalogenated Metal Phthalocyanine Pigment)

The polyhalogenated metal phthalocyanine pigment is a pigment obtained by halogenating a metal phthalocyanine, and examples thereof include polychloro copper phthalocyanine, polybromo copper phthalocyanine, polybromochloro copper phthalocyanine, polychloro zinc phthalocyanine, polybromo zinc phthalocyanine, and polybromochloro zinc phthalocyanine.

As the number of chlorine atoms and/or bromine atoms bonded to a molecule of the polyhalogenated metal phthalocyanine increases, its hue is changed from blue to green. To obtain a green textile ink, it is preferable that the number of halogen atoms bonded to a molecule of the polyhalogenated metal phthalocyanine is 8 or more.

The polyhalogenated metal phthalocyanine pigment is a pigment obtained by halogenating a metal phthalocyanine, and examples thereof include polychloro copper phthalocyanine, polybromo copper phthalocyanine, polybromochloro copper phthalocyanine, polychloro zinc phthalocyanine, polybromo zinc phthalocyanine, and polybromochloro zinc phthalocyanine.

As the number of chlorine atoms and/or bromine atoms in a molecule of the polyhalogenated metal phthalocyanine increases, its hue is changed from blue to green. To obtain a green textile ink, it is preferable that the total number of chlorine atoms and/or bromine atoms present in the molecule of the polyhalogenated metal phthalocyanine used is 8 or more.

To obtain a more yellowish and brighter green color, it is preferable that the polyhalogenated metal phthalocyanine used has a structure in which, in one polyhalogenated metal phthalocyanine molecule (structure), 8 to 15 chlorine atoms and/or bromine atoms in total are bonded to four benzene rings and hydrogen atoms are bonded to the remaining sites in the benzene rings. It is more preferable that the polyhalogenated metal phthalocyanine used has a structure in which 9 to 15 chlorine atoms and/or bromine atoms in total are bonded to the four benzene rings and hydrogen atoms are bonded to the remaining sites in the benzene rings. It is particularly preferable that the polyhalogenated metal phthalocyanine used has a structure in which 13 to 15 bromine atoms are bonded to the remaining sites in the benzene rings and hydrogen atoms are bonded to the remaining sites in the benzene rings.

Specifically, the polyhalogenated metal phthalocyanine used may be a pigment represented by general formula (2) below.

[Chem. 2]

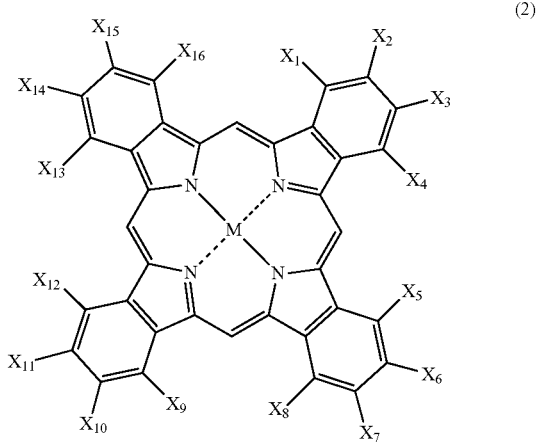

(2)

(In general formula (2) above, M is copper or zinc, and $X_1$ to $X_{16}$ are each independently a chlorine atom, a bromine atom, or a hydrogen atom, provided that the total number of chlorine and bromine atoms bonded to the rings is 8 to 15 and a hydrogen atom is present in each of the remaining sites.

In the present invention, no particular limitation is imposed on the polyhalogenated metal phthalocyanine pigment used, so long as it satisfies general formula (2) above. A mixture of a plurality of pigments satisfying general formula (2) above may be used.

Specific examples of such a pigment include C.I. Pigment Green 7 in which M in general formula (2) is copper and $X_1$ to $X_{16}$ are each a chlorine atom or a hydrogen atom, C.I. Pigment Green 36 in which M in general formula (2) is copper and $X_1$ to $X_{16}$ are each a chlorine atom, a bromine atom, or a hydrogen atom, and C.I. Pigment Green 58 in which M in general formula (2) is zinc and $X_1$ to $X_{16}$ are each a chlorine atom, a bromine atom, or a hydrogen atom. These may be used alone or as a mixture.

The polyhalogenated metal phthalocyanine pigment may be a dry pigment in the form of a powder, a granule, or a lump or may be in the form of a wet cake or a slurry.

The polyhalogenated metal phthalocyanine pigment may contain a pigment derivative as a dispersing aid.

The pigment derivative used may be a general-purpose pigment derivative such as a phthalocyanine-based pigment derivative, a quinacridone-based pigment derivative, a diketopyrrolopyrrole-based pigment derivative, an anthraquinone-based pigment derivative, or a thiazine-based pigment derivative. The derivative moiety may be a phthalimidomethyl group, a sulfonic acid group, a N-(dialkylamino)methyl group, or a N-(dialkylaminoalkyl)sulfonic acid amido group. Two or more different derivatives may be used in combination.

No particular limitation is imposed on the amount of the pigment derivative used. For example, the amount used is preferably 4 to 17 parts by mass and more preferably 6 to 13 parts by mass based on 100 parts of the polyhalogenated metal phthalocyanine pigment.

The polyhalogenated metal phthalocyanine pigment used has a particle diameter of preferably 25 µm or less and particularly preferably 1 µm or less. When the particle diameter of the polyhalogenated metal phthalocyanine pigment used falls within the above range, sedimentation of the polyhalogenated metal phthalocyanine pigment is unlikely to occur, and good pigment dispersibility is obtained.

The specific gravity of the polyhalogenated metal phthalocyanine pigment used is preferably 4.5 or less and particularly preferably 4.0 or less. Since the specific gravity of the polyhalogenated metal phthalocyanine pigment is larger than those of pigments used for basic color (cyan, magenta, yellow, and black) pigment dispersions and inks, it is more difficult to impart dispersion stability to the polyhalogenated metal phthalocyanine pigment than to the basic color pigments. However, even when the polyhalogenated metal phthalocyanine pigment used has a specific gravity within the above range, the use of the above specific polymer (A) in combination with the polyhalogenated metal phthalocyanine pigment makes it difficult for sedimentation of the polyhalogenated metal phthalocyanine pigment to occur and can reduce the number of coarse particles to a level comparable to that in the basic color pigment dispersions. Therefore, very high pigment dispersibility and ejection stability can be imparted.

(Diketopyrrolopyrrole Pigment)

Specific examples of the diketopyrrolopyrrole pigment include C.I. Pigment Red 254, C.I. Pigment Red 255, C.I. Pigment Red 264, C.I. Pigment Red 270, C.I. Pigment Red 272, Pigment Orange 71, C.I. Pigment Orange 73, and mixtures and solid solutions of at least two pigments selected from the above pigments. In terms of hue and coloring power, the diketopyrrolopyrrole pigment is more preferably C.I. Pigment Red 254 or C.I. Pigment Red 255. One diketopyrrolopyrrole pigment may be used alone, or a combination of two or more may be used. The pigment may be a dry pigment in the form of a powder, a granule, or a lump or may be in the form of a wet cake or a slurry.

The primary particle diameter of the diketopyrrolopyrrole pigment used is preferably 30 to 250 nm and particularly preferably 50 to 200 nm. When the diketopyrrolopyrrole pigment is excessively reduced in diameter, the pigment has the property that its crystals easily grow through intermolecular hydrogen bonds and generally tends to cause a reduction in dispersibility with time. In the present invention, it is preferable to use a combination of a diketopyrrolopyrrole pigment having a primary particle diameter within the above range and the above specific polymer (A). In this case, sedimentation of the diketopyrrolopyrrole pigment is unlikely to occur, and the number of coarse particles can be reduced to a level comparable to that in the basic color pigment dispersions. Therefore, very high pigment dispersibility and ejection stability can be imparted.

(Water)

The water used in the present invention is a dispersion medium for the pigment. The water used can be pure water such as ion exchanged water, ultrafiltrated water, reverse osmotic water, or distilled water or ultrapure water. The water may be used alone, or a solvent mixture of water and a water-soluble organic solvent may be used. Examples of the water-soluble organic solvent include: ketones such as acetone, methyl ethyl ketone, methyl butyl ketone, and methyl isobutyl ketone; alcohols such as methanol, ethanol, 2-propanol, 2-methyl-1-propanol, 1-butanol, and 2-methoxyethanol; ethers such as tetrahydrofuran, 1,4-dioxane, and 1,2-dimethoxyethane; dimethylformamide; N-methylpyrrolidone; glycols such as ethylene glycol, diethylene glycol, triethylene glycol, tetraethylene glycol, propylene glycol, polyethylene glycol, and polypropylene glycol; diols such as butanediol, pentanediol, hexanediol, and similar diols; glycol esters such as propylene glycol laurate; glycol ethers such as diethylene glycol monoethyl ether, diethylene glycol monobutyl ether, diethylene glycol monohexyl ether, propylene glycol ether, dipropylene glycol ether, and Cellosolves including triethylene glycol ether; alcohols such as methanol, ethanol, isopropyl alcohol, 1-propanol, 2-propanol, 1-butanol, 2-butanol, butyl alcohol, pentyl alcohol, and similar alcohols; sulfolane; lactones such as γ-butyrolactone; lactams such as N-(2-hydroxyethyl)pyrrolidone; and glycerin and derivatives thereof. One or a mixture of two or more of these water-soluble solvents may be used.

Preferably, the water-soluble organic solvent used is a high-boiling point water-soluble organic solvent, in order to omit the step of removing the solvent in processes of producing the aqueous pigment dispersion and the inks of the invention. Examples of the high-boiling point water-soluble organic solvent include: glycols such as ethylene glycol, diethylene glycol, triethylene glycol, tetraethylene glycol, propylene glycol, polyethylene glycol, and polypropylene glycol; diols such as butanediol, pentanediol, hexanediol, and similar diols; glycol esters such as propylene glycol laurate; glycol ethers such as diethylene glycol monoethyl ether, diethylene glycol monobutyl ether, diethylene glycol monohexyl ether, propylene glycol ether, dipropylene glycol ether, and Cellosolves including triethylene glycol ether; sulfolane; lactones such as γ-butyrolactone; lactams such as N-(2-hydroxyethyl)pyrrolidone; and glycerin and derivatives thereof. One or a mixture of two or more of these water-soluble organic solvents may be used.

The basic compound used may be a 100 percent pure material. However, it is preferable to use an aqueous solution obtained in advance by dissolving the basic compound in water, in order to avoid, for example, the risk of heat generation.

The water-soluble organic solvent used is preferably a high-boiling point water-soluble organic solvent because no solvent removal etc. are necessary. The water-soluble organic solvent used is preferably a water-soluble organic solvent that does not adversely affect ink characteristics after preparation of an aqueous ink for inkjet recording. Preferably, such a water-soluble organic solvent is, for example, any of the high-boiling point water-soluble organic solvents described above.

(Method for Producing Aqueous Pigment Dispersion)

The aqueous pigment dispersion of the present invention is an aqueous pigment dispersion before ink preparation in which the pigment is dispersed at a high concentration in water used as the dispersion medium.

Preferably, the pigment concentration of the aqueous pigment dispersion (the ratio of the mass of the pigment to the total mass of the aqueous pigment dispersion) is generally 10 to 50% by mass. To prepare an ink using the aqueous pigment dispersion, the aqueous pigment dispersion is diluted to a pigment concentration of 0.1 to 20% by mass by supplying water or an additive appropriately according to the desired application and physical properties of the ink.

In the present invention, it is preferable that, before dispersed in water, the pigment is dispersed in a mixture of the polymer (A) and a water-soluble organic solvent in advance. Specifically, the polymer (A), the basic compound, and the pigment are mixed well using a stirrer or a dispersing device in the presence of the water-soluble organic solvent to thereby obtain a pigment dispersion, and the dispersion is mixed with water to thereby obtain the aqueous pigment dispersion.

In particular, to disperse a hard-to-disperse pigment such as the polyhalogenated metal phthalocyanine pigment or the diketopyrrolopyrrole pigment, it is preferable, in terms of improving the dispersibility of the pigment, to use a method in which the polymer (A) is appropriately added in the course of mixing using a stirrer or a dispersing device.

In the present invention, no particular limitation is imposed on the amounts of the raw materials added. It is preferable that the raw materials are added at the following exemplary ratios.

The polymer (A) is added in an amount of preferably 5 to 200 parts by mass and more preferably 5 to 100 parts by mass based on 100 parts by mass of the total amount of the pigment.

The water-soluble organic solvent is added in an amount of preferably 20 to 200 parts by mass and more preferably 30 to 200 parts by mass based on 100 parts by mass of the total amount of the pigment.

As described above, it is preferable to use the basic compound such that the degree of neutralization of the polymer (A) is 20% to 200%, and it is more preferable to use the basic compound such that the degree of neutralization is 80% to 150%. The degree of neutralization in this case is computed using the following formula, as described above.

$$\text{Degree of neutralization (\%)} = ((\text{mass (g) of basic compound}) \times 56 \times 1{,}000)/(\text{acid value (mg KOH/g) of polymer }(A) \times \text{number of equivalents of basic compound} \times \text{mass (g) of polymer }(A)) \times 100 \quad [\text{Math. 3}]$$

In the step of obtaining the dispersion of the polymer (A), the basic compound, the water-soluble organic solvent, and the pigment, a small amount of water may be used, so long as the effects of the present invention are not impaired. However, the presence of a large amount of water in the initial stage of the pigment dispersing process may cause a reduction in the pigment dispersion efficiency of the polymer (A) and may cause the formation of clusters composed only of the polymer (A). Therefore, it is preferable to use only a small amount of water.

No particular limitation is imposed on the dispersing method, and any known dispersing method may be used. Examples of the dispersing method include: a media mill dispersing method that uses media in a paint shaker, a bead mill, a sand mill, a ball mill, etc.; a media-less dispersing method using an ultrasonic homogenizer, a high-pressure homogenizer, a Nanomizer, an Ultimaizer, etc.; and a kneading dispersing method with strong shearing force that uses a roll mill, a Henschel mixer, a pressure kneader, an intensive mixer, a Banbury mixer, a planetary mixer, etc. In the kneading dispersing method, strong shearing force is applied to the high-solid content mixture containing the pigment using a kneader to reduce the size of the pigment particles. The kneading dispersing method is preferred because an aqueous pigment dispersion having a high pigment concentration can be obtained and the number of coarse particles can be effectively reduced.

(Aqueous Ink for Inkjet Recording)

After dilution to a desired concentration, the aqueous pigment dispersion of the present invention can be used in the field of coatings for automobiles and buildings and also used for printing inks such as offset inks, gravure inks, flexographic inks, and silk screen inks and for aqueous inks for inkjet recording. These may be produced by diluting the aqueous pigment dispersion to a desired concentration and then performing a centrifugation step or a filtration step as needed. In particular, since the aqueous pigment dispersion contains a reduced number of coarse particles, it can be particularly preferably used for an aqueous ink for inkjet recording.

Examples of the aqueous ink for inkjet recording containing the aqueous pigment dispersion of the present invention include an aqueous green ink for inkjet recording and an aqueous red ink for inkjet recording.

The aqueous green ink for inkjet recording and the aqueous red ink for inkjet recording may optionally contain a humectant (drying retarder), a penetrant, or other additives in order to obtain the desired physical properties.

(Humectant)

The humectant may be used for the purpose of preventing drying of each ink. The content of the humectant is 3 to 50% by mass with respect to the total mass of the ink.

No particular limitation is imposed on the humectant. It is preferable that the humectant is miscible with water and provides the effect of preventing clogging of a head of an inkjet printer. Examples of the humectant include glycerin, ethylene glycol, diethylene glycol, triethylene glycol, polyethylene glycol having a molecular weight of 2,000 or less, propylene glycol, dipropylene glycol, tripropylene glycol, 1,3-propylene glycol, isopropylene glycol, isobutylene glycol, 1,4-butanediol, 1,3-butanediol, 1,5-pentanediol, 1,6-hexanediol, meso-erythritol, pentaerythritol, sulfolane, lactones such as γ-butyrolactone, lactams such as N-(2-hydroxyethyl)pyrrolidone, and glycerin and derivatives thereof. In particularly, when propylene glycol or 1,3-butanediol is contained, safety is achieved, and advantageous effects such as good drying properties and ejection performance of the ink are obtained.

(Penetrant)

The penetrant may be used for the purpose of improving penetrability into a recording medium and controlling the diameter of dots on the recording medium.

Examples of the penetrant include: lower alcohols such as ethanol and isopropyl alcohol; ethylene oxide adducts of alkyl alcohols such as ethylene glycol hexyl ether and diethylene glycol butyl ether; and propylene oxide adducts of alkyl alcohols such as propylene glycol propyl ether. The content of the penetrant is preferably 0.01 to 10% by mass with respect to the total mass of the ink.

(Surfactant)

The surfactant may be used in order to control ink properties such as surface tension. No particular limitation is imposed on the surfactant. Examples of the surfactant include anionic surfactants, nonionic surfactants, cationic surfactants, and amphoteric surfactants. Of these, anionic surfactants and nonionic surfactants are preferred.

Examples of the anionic surfactant include alkylbenzenesulfonates, alkylphenylsulfonates, alkylnaphthalenesulfonates, higher fatty acid salts, sulfates of higher fatty acid esters, sulfonates of higher fatty acid esters, sulfates and sulfonates of higher alcohol ethers, higher alkyl sulfosuccinates, polyoxyethylene alkyl ether carboxylates, polyoxyethylene alkyl ether sulfates, alkyl phosphates, and polyoxyethylene alkyl ether phosphates. Specific examples of the anionic surfactant include dodecylbenzenesulfonate, isopropylnaphthalenesulfonate, monobutylphenylphenolmonosulfonate, monobutylbiphenylsulfonate, and dibutylphenylphenoldisulfonate.

Examples of the nonionic surfactant include polyoxyethylene alkyl ethers, polyoxyethylene alkyl phenyl ethers, polyoxyethylene fatty acid esters, sorbitan fatty acid esters, polyoxyethylene sorbitan fatty acid esters, polyoxyethylene sorbitol fatty acid esters, glycerin fatty acid esters, polyoxyethylene glycerin fatty acid esters, polyglycerin fatty acid esters, sucrose fatty acid esters, polyoxyethylene alkyl amines, polyoxyethylene fatty acid amides, fatty acid alkylolamides, alkyl alkanolamides, acetylene glycol, oxyethylene adducts of acetylene glycol, and polyethylene glycol-polypropylene glycol block copolymers. Of these, polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene sorbitan fatty acid esters, fatty acid alkylolamides, acetylene glycol, oxyethylene adducts of acetylene glycol, and polyethylene glycol-polypropylene glycol block copolymers are preferred. In particular, nonionic surfactants with an HLB within the range of 7 to 20 are preferred because of their high dissolution stability.

Other surfactants may be used such as: silicone-based surfactants such as polysiloxane oxyethylene adducts; fluorine-based surfactants such as perfluoroalkyl carboxylates, perfluoroalkyl sulfonates, and oxyethylene perfluoroalkyl ethers; and bio-surfactants such as spiculisporic acid, rhamnolipid, and lysolecithin.

These surfactants may be used alone or as a mixture of two or more types. The amount of the surfactant used is preferably within the range of 0.001 to 2% by mass, more preferably within the range of 0.001 to 1.5% by mass, and still more preferably within the range of 0.01 to 1% by mass with respect to the total mass of the ink. When the surfactant is used in an amount within the prescribed range, ejection stability and the accuracy of dot diameter control can be improved, and clarity in printed image quality can be further improved.

If necessary, a preservative, a viscosity modifier, a pH modifier, a chelating agent, a plasticizer, an antioxidant, an ultraviolet absorber, etc. may be added.

Some water-soluble organic solvents used in the above-described step 1 function as, for example, a humectant or a penetrant. When a water-soluble organic solvent having such a function is used in the above-described step 1, it is preferable to add the solvent while its amount is controlled.

The total amount of the pigment in each of the aqueous green ink for inkjet recording and the aqueous red ink for inkjet recording is preferably 0.1 to 20% by mass, in order to obtain a sufficient image density and to ensure the dispersion stability of the pigment in the ink.

(Recording Medium)

No particular limitation is imposed on the recording medium for the water-based inks for inkjet recording. The recording medium may be an absorptive recording medium such as copying paper generally used in copiers (PPC paper), a recording medium having an ink absorbing layer, a non-absorptive recording medium having no ink absorbency, a low-absorptive recording medium having low ink absorbency, etc. One feature of the water-based inks for inkjet recording of the present invention is that good color development is achieved particularly when recording is performed on a recording medium having an ink absorbing layer, a non-absorptive recording medium, and a low-absorptive recording medium.

Examples of the absorptive recording medium include plain paper, fabric, corrugated cardboards, and wood. Examples of the recording medium having an absorbing layer include inkjet paper. Specific examples of the inkjet paper include PICTORICOPRO Photopaper manufactured by Pictorico.

Examples of the non-absorptive recording medium having no ink absorbency include products used as food packaging materials, and well-known plastic films can be used. Specific examples include: polyester films such as polyethylene terephthalate films and polyethylene naphthalate films; polyolefin films such as polyethylene films and polypropylene films; polyamide-based films such as nylon films; polystyrene films; polyvinyl alcohol films; polyvinyl chloride films; polycarbonate films; polyacrylonitrile films; and polylactic acid films. In particular, polyester films, polyolefin films, and polyamide-based films are preferred, and polyethylene terephthalate, polypropylene, and nylon are more preferred. The above films may be coated with, for example, polyvinylidene chloride in order to impart barrier properties. If necessary, a film on which a vapor deposition layer of a metal such as aluminum or a metal oxide such as silica or alumina is deposited may be used in combination with any of the above films.

The above plastic films may be unstretched films or may be uniaxially or biaxially stretched films. The surface of each plastic film may be untreated. However, it is preferable that the film is subjected to treatment such as corona discharge treatment, ozone treatment, low-temperature plasma treatment, flame treatment, glow discharge treatment, etc. in order to improve adhesion.

The thickness of the plastic film is appropriately changed according to its intended application. For example, when the film is used for soft packaging application, the thickness of the film is preferably 10 µm to 100 µm so that the film can have flexibility, durability, and curling resistance. The thickness is more preferably 10 µm to 30 µm. Specific examples of such a film include PYLEN (registered trademark) available from TOYOBO Co., Ltd.

Art paper such as printing paper, coated paper, light coated paper, lightweight coated paper, etc. can be used for the low-absorptive recording medium having low-ink absorbency. Such a low-absorptive recording medium is prepared by applying a coating material to the surface of high-quality or acid-free paper that is formed mainly of cellulose and is generally not surface-treated to thereby form a coating layer. Examples of the low-absorptive recording medium include: lightweight coated paper such as "OK EVERLIGHT COAT" manufactured by Oji Paper Co., Ltd. and "AURORA S" manufactured by Nippon Paper Industries Co., Ltd.; light coated paper (A3) such as "OK Coat L" manufactured by Oji Paper Co., Ltd. and "AURORA L" manufactured by Nippon Paper Industries Co., Ltd.; coated paper (A2, B2) such as "OK Top Coat+" manufactured by Oji Paper Co., Ltd. and "AURORA Coat" manufactured by Nippon Paper Industries Co., Ltd.; and art paper (A1) such as "OK KINFUJI+" manufactured by Oji Paper Co., Ltd. and "Tokubishi Art" manufactured by Mitsubishi Paper Mills Limited.

EXAMPLES

The present invention will next be described in more detail by way of Examples.

Synthesis Examples of Polymer (A)

Synthesis Example 1 n-Butyllithium (BuLi) used as the polymerization initiator and styrene (St) used as the first monomer were introduced from the tube reactors P1 and P2 in FIG. 1 into the T-shaped micromixer M1 in FIG. 1 and subjected to living anionic polymerization to form a polymer.

Next, the polymer obtained was transferred to the T-shaped micromixer M2 in FIG. 1 through a tube reactor R1 in FIG. 1, and a reaction control agent (1,1-diphenylethylene (DPE)) introduced from the tube reactor P3 in FIG. 1 was caused to react with the growing end of the polymer.

Next, tert-butyl methacrylate (t-BMA) used as the second monomer was introduced into the T-shaped micromixer M3 from the tube reactor P4 in FIG. 1. The second monomer and the polymer transferred through a tube reactor R2 in FIG. 1 were subjected to a continuous living anionic polymerization reaction. Then the reaction was quenched with methanol to thereby produce a block copolymer (PA-6).

In this process, the entire microreactor was immersed in a thermostatic bath to set the reaction temperature to 24° C. Each of the monomers and the reaction control agent introduced into the microreactor was dissolved in tetrahydrofuran (THF). The BuLi used was a commercial 2.6M hexane solution, and this solution was diluted with hexane. The molar ratio in the block copolymer (PA-6) was controlled by the concentration and introduction rate of the diluted solution as follows.

Molar Ratio in Block Copolymer (PA-6)

Polymerization initiator/first monomer/reaction control agent/second monomer=1.0/13.3/1.0/8.1

The block copolymer (PA-6) obtained was treated with a cation exchange resin to hydrolyze the t-butoxycarbonyl groups in the t-BMA block to thereby reconvert them into carboxyl groups. The reaction solution was subjected to evaporation under reduced pressure, and the solids obtained were pulverized to obtain a powder of polymer (P-6) used as the polymer (A).

The number average molecular weight, acid value, and solubility in water of the polymer (A) obtained, the presence or absence of fine particles when the degree of neutralization is 1000, the average diameter (nm) of the particles, and surface tension (dyn/cm) are shown in a table described later.

Synthesis Example 2

BuLi used as the polymerization initiator and St used as the first monomer were introduced from the tube reactors P1 and P2 in FIG. 1 into the T-shaped micromixer M1 in FIG. 1 and subjected to living anionic polymerization to form a polymer.

Next, the polymer obtained was transferred to the T-shaped micromixer M2 in FIG. 1 through the tube reactor R1 in FIG. 1, and a reaction control agent (α-methylstyrene (α-MeSt)) introduced from the tube reactor P3 in FIG. 1 was caused to react with the growing end of the polymer.

Next, t-BMA used as the second monomer was introduced into the T-shaped micromixer M3 from the tube reactor P4 in FIG. 1. The second monomer and the polymer transferred through the tube reactor R2 in FIG. 1 were subjected to a continuous living anionic polymerization reaction. Then the reaction was quenched with methanol to thereby produce a block copolymer (PA-13).

In this process, the entire microreactor was immersed in a thermostatic bath to set the reaction temperature to 24° C. Each of the monomers and the reaction control agent introduced into the microreactor was dissolved in THF. The BuLi used was a commercial 2.6M hexane solution, and this solution was diluted with hexane. The molar ratio in the block copolymer (PA-13) was controlled by the concentration and introduction rate of the diluted solution as follows.

Molar ratio in block copolymer (PA-13)

Polymerization initiator/first monomer/reaction control agent/second monomer=1.0/12.0/1.3/8.1

The block copolymer (PA-13) obtained was treated with a cation exchange resin to perform hydrolysis. The reaction solution was subjected to evaporation under reduced pressure, and the solids obtained were pulverized to obtain a powder of polymer (P-13).

Synthesis Example 3

A polymer (P-14) was produced by the same method as in Synthesis Example 2 except that "Molar ratio of polymer block ($A^2$) formed of first monomer to polymer block ($A^3$) formed of second monomer" in the table below was adjusted to values shown in the table.

Comparative Synthesis Example 1: Synthesis Example of Comparative Example Polymer (PH-1)

(Method for Preparing Random Copolymer)

A reaction vessel equipped with a stirrer, a dropping unit, and a reflux unit was charged with 100 parts by mass of methyl ethyl ketone, and the reaction vessel was purged with nitrogen under stirring. While the nitrogen atmosphere in the reaction vessel was maintained, the reaction vessel was heated to allow the methyl ethyl ketone to reflux, and then a solution mixture of 74 parts by mass of St, 11 parts by mass of acrylic acid, 15 parts by mass of methacrylic acid, and 8 parts by mass of a polymerization initiator ("V-75" manufactured by Wako Pure Chemical Industries, Ltd.) was added dropwise from the dropping unit over 2 hours. The temperature of the reaction system was held at 80° C. at some point during the dropwise addition.

After completion of the dropwise addition, the reaction was continued at 80° C. for 25 hours. During the reaction, the polymerization initiator was added as needed while the consumption of the raw materials was checked. After completion of the reaction, methyl ethyl ketone was removed by evaporation under reduced presser, and the solids obtained were pulverized to thereby obtain a powder of polymer (PH-1).

The number average molecular weight of the polymer (PR-1) was 5,255, its weight average molecular weight was 9,000, and its acid value was 185 mg KOH/g.

(Methods for Measuring Physical Properties of Polymers)

The physical properties of the polymers obtained were measured as follows.

(Method for Measuring Number Average Molecular Weight (Mn) and Weight Average Molecular Weight (Mw))

The measurement was performed by gel permeation chromatography (GPC) under the following conditions.

Measurement device: High performance GPC ("HLC-8220GPC" manufactured by TOSOH Corporation)

Columns: The following columns manufactured by TOSOH Corporation were connected in series and used.

"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1

Detector: RI (refractive index detector)
Column temperature: 40° C.
Eluent: tetrahydrofuran (THF)
Flow rate: 1.0 mL/min Injection amount: 100 μL (THF solution with a sample concentration of 0.4% by mass)

Standard samples: The following polystyrene standards were used to produce a calibration curve.

(Polystyrene Standards)

"TSKgel standard polystyrene A-500" manufactured by TOSOH Corporation

"TSKgel standard polystyrene A-1000" manufactured by TOSOH Corporation

"TSKgel standard polystyrene A-2500" manufactured by TOSOH Corporation

"TSKgel standard polystyrene A-5000" manufactured by TOSOH Corporation

"TSKgel standard polystyrene F-1" manufactured by TOSOH Corporation

"TSKgel standard polystyrene F-2" manufactured by TOSOH Corporation

"TSKgel standard polystyrene F-4" manufactured by TOSOH Corporation

"TSKgel standard polystyrene F-10" manufactured by TOSOH Corporation

"TSKgel standard polystyrene F-20" manufactured by TOSOH Corporation

"TSKgel standard polystyrene F-40" manufactured by TOSOH Corporation

"TSKgel standard polystyrene F-80" manufactured by TOSOH Corporation

"TSKgel standard polystyrene F-128" manufactured by TOSOH Corporation

"TSKgel standard polystyrene F-288" manufactured by TOSOH Corporation

"TSKgel standard polystyrene F-550" manufactured by TOSOH Corporation (Method for Measuring Acid Value)

The measurement was performed according to JIS test method K 0070-1992. Specifically, 0.5 g of a polymer was dissolved in a tetrahydrofuran (THF) solvent, and titration with a 0.1M alcohol solution of potassium hydroxide was performed using phenolphthalein as an indicator to determine the acid value.

(Method for Measuring Solubility in Water)

Sieves with mesh sizes of 250 μm and 90 μm were used to screen a polymer such that its particle diameter fell within the range of 250 μm to 90 μm. 0.5 g of the resulting polymer was sealed in a bag formed from a 400-mesh wire net, immersed in 50 mL of water, and left under mild stirring at a temperature of 25° C. for 24 hours. After immersion for 24 hours, the 400-mesh wire net with the polymer sealed therein was dried in a dryer set at 110° C. for 2 hours to dry the polymer. The change in weight of the 400-mesh wire net with the polymer sealed therein before and after the immersion in water was measured, and the solubility was computed using the following formula.

$$\text{Solubility (g/100 mL)} = (\text{polymer-sealed 400-mesh wire net before immersion (g)} - \text{polymer-sealed 400-mesh wire net after immersion (g)}) \times 2 \quad [\text{Math. 4}]$$

(Method for Determining Formation of Fine Particles in Water and Method for Measuring Average Particle Diameter (Nm))

(1) The acid value of a polymer was determined according to the above-described method for measuring the acid value.

(2) 1 g of the polymer was added to 50 mL of water, and a 0.1 mol/L aqueous potassium hydroxide solution was added in an amount sufficient to completely neutralize the polymer having the acid value obtained in (1) above to thereby completely neutralize the polymer.

(3) The completely neutralized solution was subjected to ultrasonic waves at a temperature of 25° C. for 2 hours using an ultrasonic cleaner (ultrasonic cleaner US-102, SND Co., Ltd., 38 kHz, self-excited oscillation) to disperse the polymer and was then left to stand at room temperature for 24 hours.

After the solution was left to stand for 24 hours, a sample solution was sampled at a depth of 2 cm from the surface of the solution. Then a dynamic light scattering particle size measurement device ("Microtrac particle size distribution analyzer UPA-ST150" manufactured by NIKKISO Co., Ltd.) was used to determine whether or not information about light scattering due to the formation of fine particles was obtained, whereby the presence of fine particles was checked. At the same time, the average particle diameter was measured.

(Method for Measuring Surface Tension)

The same sample solution as that obtained in the method for determining the formation of fine particles in water was used, and a value measured using a Wilhelmy surface tension meter was used as the surface tension.

The raw materials, reaction conditions, and physical properties of each of the polymers obtained in the above Synthesis Examples and Comparative Synthesis Example are shown in tables.

TABLE 1

|  |  | Synthesis Example 1 | Synthesis Example 2 | Synthesis Example 3 |
|---|---|---|---|---|
| Polymer (A) |  | P-6 | P-13 | P-14 |
| Reaction temperature |  | 24° C. | 24° C. | 24° C |
| Polymerization initiator | Type | BuLi | BuLi | BuLi |
|  | Moles | 1.0 | 1.0 | 1.0 |
| First monomer | Type | St | St | St |
|  | Moles | 13.3 | 12.0 | 12.0 |
| Reaction control agent | Type | DPE | α-MeSt | α-MeSt |
|  | Moles | 1.0 | 1.3 | 2.0 |
| Second monomer | Type | tBMA | tBMA | tBMA |
|  | Moles | 8.1 | 8.1 | 8.1 |
| Molar ratio of polymer block ($A^2$) formed of first monomer to polymer block ($A^3$) formed of second monomer | $A^2:A^3 =$ | 100:61 | 100:68 | 100:76 |
| Number average molecular weight |  | 2317 | 2382 | 2471 |
| Acid value | mg KOH/g | 145 | 145 | 148 |

TABLE 1-continued

|  | Synthesis Example 1 | Synthesis Example 2 | Synthesis Example 3 |
|---|---|---|---|
| Solubility in water (g/100 mL) | 0.0034 | 0.0084 | 0.0056 |
| Presence of fine particles when degree of neutralization is 100%/average particle diameter (nm) | Yes/344 | Yes/82 | Yes/48 |
| Surface tension (dyn/cm) | 66.6 | 66.2 | 67.7 |

TABLE 2

|  |  | Comparative Synthesis Example 1 |
|---|---|---|
| Polymer |  | PH-1 |
| Monomer | Type | St |
|  | Moles | 68.5 |
| Monomer | Type | AA |
|  | Moles | 14.7 |
| Monomer | Type | MAA |
|  | Moles | 16.8 |
| Number average molecular weight |  | 5255 |
| Acid value | mg KOH/g | 185 |
| Solubility in water (g/100 mL) |  | 0.031 |
| Presence of fine particles when degree of neutralization is 100%/average particle diameter (nm) |  | No |
| Surface tension(dyn/cm) |  | 45.0 |

In Tables 1 and 2, BuLi stands for normal butyllithium, St stands for styrene, DPE stands for 1,1-diphenylethylene, uMeSt stands for α-methylstyrene, and tBMA stands for tert-butyl methacrylate.

Examples: Methods for Producing Aqueous Pigment Dispersions

Aqueous pigment dispersions were obtained by the following methods. The amounts of the raw materials used are shown in tables described later.

<Method (X1) for Producing Aqueous Pigment Dispersion Using Atmospheric Pressure Kneader>

Step 1 was performed. Specifically, a 0.2 L atmospheric pressure kneader (manufactured by Advance Co., Ltd.) was charged with 120 parts by mass of the polyhalogenated metal phthalocyanine pigment and 36 parts by mass of one of P-6, P-13, and P-14, i.e., the polymers (A) obtained by the above-described methods, or PH-1 obtained in the Comparative Synthesis Example, and mixing was performed at a jacket temperature of 80° C. (blade rotation speed: 40 rpm). Then 52 parts by mass of diethylene glycol used as the water-soluble solvent and 15 parts by mass of a 34 mass % aqueous potassium hydroxide solution used as the basic compound were added, and kneading was performed for 1 hour.

Next, step 2 was performed. Specifically, 360 parts by mass of ion exchanged water was gradually added to the kneaded product in the container under continuous stirring, and then a solution mixture of 68 parts by mass of diethylene glycol and ion exchanged water (the amount of the ion exchanged water was adjusted such that the total amount of the ion exchanged water and the 34 mass % aqueous potassium hydroxide solution added previously was 164 parts by mass) was added and mixed. A green aqueous pigment dispersion with a pigment concentration of 15.0% by mass was thereby obtained.

<Method (X2) for Producing Aqueous Pigment Dispersion Using Atmospheric Pressure Kneader>

Step 1 was performed. Specifically, a 0.2 L atmospheric pressure kneader (manufactured by Advance Co., Ltd.) was charged with 120 parts by mass of the polyhalogenated metal phthalocyanine pigment and 24 parts by mass of P-13, i.e., a polymer (A) obtained by one of the above methods, and mixing was performed at a jacket temperature of 80° C. (blade rotation speed: 40 rpm). Then 52 parts by mass of diethylene glycol used as the water-soluble solvent and 10 parts by mass of a 34 mass % aqueous potassium hydroxide solution used as the basic compound were added, and kneading was performed for 1 hour.

Next, step 2 was performed. Specifically, 360 parts by mass of ion exchanged water was gradually added to the kneaded product in the container under continuous stirring, and then a solution mixture of 68 parts by mass of diethylene glycol and ion exchanged water (the amount of the ion exchanged water was adjusted such that the total amount of the ion exchanged water and the 34 mass % aqueous potassium hydroxide solution added previously was 176 parts by mass) was added and mixed. A green aqueous pigment dispersion with a pigment concentration of 15.0% by mass was thereby obtained.

<Method (X3) for Producing Aqueous Pigment Dispersion Using Atmospheric Pressure Kneader>

Step 1 was performed. Specifically, a 0.2 L atmospheric pressure kneader (manufactured by Advance Co., Ltd.) was charged with 120 parts by mass of the polyhalogenated metal phthalocyanine pigment, 6 parts by mass of a phthalocyanine-based pigment derivative, and 24 parts by mass of P-13, i.e., a polymer (A) obtained by one of the above-described methods, and mixing was performed at a jacket temperature of 80° C. (blade rotation speed: 40 rpm). Then 52 parts by mass of diethylene glycol used as the water-soluble solvent and 10 parts by mass of a 34 mass % aqueous potassium hydroxide solution used as the basic compound were added, and kneading was performed for 1 hour.

Next, step 2 was performed. Specifically, 360 parts by mass of ion exchanged water was gradually added to the kneaded product in the container under continuous stirring, and then a solution mixture of 68 parts by mass of diethylene glycol and ion exchanged water (the amount of the ion exchanged water was adjusted such that the total amount of the ion exchanged water and the 34 mass % aqueous potassium hydroxide solution added previously was 170 parts by mass) was added and mixed. A green aqueous pigment dispersion with a pigment concentration of 15.0% by mass was thereby obtained.

<Method (Y1) for producing aqueous pigment dispersion using intensive mixer>

Step 1 was performed. Specifically, a 1.0 L intensive mixer (Nippon Eirich Co., Ltd.) was charged with 150 parts by mass of the polyhalogenated metal phthalocyanine pigment, 45 parts by mass of one of P-6, P-13, and P-14, i.e., the polymers (A) obtained by the above-described methods, or PH-1 obtained in the Comparative Synthesis Example, 95 parts by mass of triethylene glycol used as the water-soluble organic solvent, and 19 or 24 parts by mass of a 34 mass % aqueous potassium hydroxide solution, and then the mixture was kneaded at a rotor peripheral speed of 2.94 m/s and a pan peripheral speed of 1 m/s for 25 minutes.

Next, step 2 was performed. Specifically, 450 parts by mass of ion exchanged water was gradually added to the kneaded product in the container of the intensive mixer under continuous stirring, and a solution mixture of 55 parts by mass of triethylene glycol used as the water-soluble solvent and ion exchanged water (the amount of the ion exchanged water was adjusted such that the total amount of the ion exchanged water and the 34 mass % aqueous potassium hydroxide solution added previously was 205 parts by mass) was added and mixed. A green aqueous pigment dispersion with a pigment concentration of 15.0% by mass was thereby obtained.

<Method (Y2) for Producing Aqueous Pigment Dispersion Using Intensive Mixer>

Step 1 was performed. Specifically, a 1.0 L intensive mixer (Nippon Eirich Co., Ltd.) was charged with 150 parts by mass of the polyhalogenated metal phthalocyanine pigment, 30 parts by mass of P-13, i.e., a polymer (A) obtained by one of the above methods, or PH-1 obtained in the Comparative Synthesis Example, 95 parts by mass of triethylene glycol used as the water-soluble organic solvent, and 13 or 16 parts by mass of a 34 mass % aqueous potassium hydroxide solution, and then the mixture was kneaded at a rotor peripheral speed of 2.94 m/s and a pan peripheral speed of 1 m/s for 25 minutes.

Next, step 2 was performed. Specifically, 450 parts by mass of ion exchanged water was gradually added to the kneaded product in the container of the intensive mixer under continuous stirring, and a solution mixture of 55 parts by mass of triethylene glycol used as the water-soluble solvent and ion exchanged water (the amount of the ion exchanged water was adjusted such that the total amount of the ion exchanged water and the 34 mass % aqueous potassium hydroxide solution added previously was 220 parts by mass) was added and mixed. A green aqueous pigment dispersion with a pigment concentration of 15.0% by mass was thereby obtained.

<Method (Y3) for Producing Aqueous Pigment Dispersion Using Intensive Mixer>

Step 1 was performed. Specifically, a 1.0 L intensive mixer (Nippon Eirich Co., Ltd.) was charged with 150 parts by mass of the polyhalogenated metal phthalocyanine pigment, 7 parts by mass of a phthalocyanine-based pigment derivative, 30 parts by mass of P-13, i.e., a polymer (A) obtained by one of the above methods, or PH-1 obtained in the Comparative Synthesis Example, 95 parts by mass of triethylene glycol used as the water-soluble organic solvent, and 14 or 16 parts by mass of a 34 mass % aqueous potassium hydroxide solution, and then the mixture was kneaded at a rotor peripheral speed of 2.94 m/s and a pan peripheral speed of 1 m/s for 25 minutes.

Next, step 2 was performed. Specifically, 450 parts by mass of ion exchanged water was gradually added to the kneaded product in the container of the intensive mixer under continuous stirring, and a solution mixture of 55 parts by mass of triethylene glycol used as the water-soluble solvent and ion exchanged water (the amount of the ion exchanged water was adjusted such that the total amount of the ion exchanged water and the 34 mass % aqueous potassium hydroxide solution added previously was 213 parts by mass) was added and mixed. A green aqueous pigment dispersion with a pigment concentration of 15.0% by mass was thereby obtained.

(Evaluation Methods)

Each of the aqueous pigment dispersions obtained above was evaluated by measuring the following items.

<Volume Average Particle Diameter>

One of the aqueous pigment dispersions produced was diluted 5,000-fold, and measurement was performed using Microtrac UPA-150 (manufactured by NIKKISO Co., Ltd.). The average of three measured values was used.

<Number of Coarse Particles>

One of the aqueous pigment dispersions produced was diluted 2,000-fold, and measurement was performed using AccuSizer 780APS (manufactured by International business). The measured number of coarse particles was converted to the number of particles per 1 mL in the aqueous pigment dispersion before dilution. The unit of the number of particles in each table is ($\times 10^8$/mL). In the present invention, an aqueous pigment dispersion with the number of coarse particles exceeding $100 \times 10^8$/mL was rated fail.

<Storage Stability>

One of the aqueous pigment dispersions was stored at 60° C. for 2 weeks, and then the volume average particle diameter and the number of coarse particles were measured to evaluate storage stability. When both the ratio of the change in the volume average particle diameter of the aqueous pigment dispersion after storage in the environment of 60° C. for 2 weeks to that immediately after preparation (its initial value) and the ratio of the change in the number of coarse particles after storage to that immediately after preparation (its initial value) were 5% or less, the aqueous pigment dispersion was rated A. When these ratios were more than 5% and 10% or less, the aqueous pigment dispersion was rated B. When these ratios were more than 10%, the aqueous pigment dispersion was rated C.

<Ejectability>

To measure inkjet ejection characteristics and the optical density of a printed object, the aqueous pigment dispersions having a pigment concentration of 15% by mass and produced by the above-described methods were used to produce aqueous inks for inkjet recording used for evaluation as follows.

The following components were used in the listed amounts based on 100 parts by mass of the total amount of the components. The amounts of these components were adjusted in consideration of the pigment concentration of each of the aqueous pigment dispersions produced such that the final pigment concentration was 5% by mass.

Aqueous pigment dispersion: 33.3 parts by mass
Triethylene glycol monobutyl ether: 8 parts by mass
2-Pyrrolidone: 8 parts by mass
Glycerin: 3 parts by mass
Surfynol 440 (manufactured by Air Products and Chemicals, Inc.): 0.5 parts by mass
Water: balance Each of the produced aqueous inks for inkjet recording was tested using an inkjet printer (EM-930C manufactured by SEIKO EPSON CORPORATION). After a cartridge was filled with the ink, a nozzle check pattern was printed. Then, printing was performed in a single-color mode on PICTORICOPRO Photopaper (manufactured by Pictorico) and OK Top Coat+(manufactured by Oji Paper Co., Ltd.). Specifically, the printing was performed in a 340 cm² area on each of the A4 sheets at a print density setting of 100%. Then the nozzle check test pattern was again printed. The nozzle conditions were compared before and after the test to check whether or not the number of clogged nozzles increased to thereby evaluate ejectability. The criteria for the ejectability evaluation are as follows. When the number of clogged nozzles did not increase, the ink was rated A. When the increase in the number of clogged nozzles was 5 or less, the ink was rated B. When the increase in the number of clogged nozzles was more than 5, the ink was rated C.

The methods used to produce the aqueous pigment dispersions, their composition, and the evaluated characteristics are shown in Tables below.

TABLE 3

| Green | Example 1 | Example 2 | Example 3 | Example 4 | Example 5 | Example 6 | Example 7 | Example 8 |
|---|---|---|---|---|---|---|---|---|
| Method for producing aqueous pigment dispersion | X1 | X1 | X1 | Y1 | Y1 | Y1 | Y1 | Y1 |
| Pigment | PG.36 | PG.36 | PG.36 | PG.36 | PG.36 | PG.36 | PG.7 | PG.58 |
| Pigment (parts by mass) | 120 | 120 | 120 | 150 | 150 | 150 | 150 | 150 |
| Polymer (A) | P-6 | P-13 | P-14 | P-6 | P-13 | P-14 | P-13 | P-13 |
| Polymer (A) (parts by mass) | 36 | 36 | 36 | 45 | 45 | 45 | 45 | 45 |
| Acid value of polymer (A) | 145 | 145 | 148 | 145 | 145 | 148 | 145 | 145 |
| Mass ratio [polymer (A)/pigment] | 0.3 | 0.3 | 0.3 | 0.3 | 0.3 | 0.3 | 0.3 | 0.3 |
| Step 1 | | | | | | | | |
| Water-soluble organic solvent | DEG | DEG | DEG | TEG | TEG | TEG | TEG | TEG |
| Water-soluble organic solvent (parts by mass) | 52 | 52 | 52 | 95 | 95 | 95 | 95 | 95 |
| KOH amount (parts by mass) | 15 | 15 | 15 | 19 | 19 | 19 | 19 | 19 |
| Step 2 | | | | | | | | |
| Dispersion medium: 1st addition (parts by mass) | water = 360 | water = 360 | water = 360 | water = 450 | water = 450 | water = 450 | water = 450 | water = 450 |
| Dispersion medium: 2nd addition (parts by mass) | DEG:water = 68/149 | DEG:water = 68/149 | DEG:water = 68/149 | TEG:water = 55/186 | TEG:water = 55/186 | TEG:water = 55/186 | TEG:water = 55/186 | TEG:water = 55/186 |
| Volume average particle diameter (nm) of aqueous pigment dispersion | 76 | 77 | 76 | 77 | 78 | 76 | 120 | 72 |
| Number of coarse particles of 0.5 μm or more ($\times 10^8$/mL) | 6 | 7 | 6 | 6 | 7 | 7 | 32 | 7 |
| Ejectability | A | A | A | A | A | A | B | A |
| Storage stability | A | A | A | A | A | A | B | A |

TABLE 4

| Green | Example 9 | Example 10 | Example 11 | Example 12 |
|---|---|---|---|---|
| Method for producing aqueous pigment dispersion | X2 | X3 | Y2 | Y3 |
| Pigment | PG.36 | PG.36 | PG.36 | PG.36 |
| Pigment (parts by mass) | 120 | 120 | 150 | 150 |
| Pigment derivative | — | phthalocyanine-based derivative | — | phthalocyanine-based derivative |
| Pigment derivative (parts by mass) | — | 6 | — | 7 |
| Polymer (A) | P-13 | P-13 | P-13 | P-13 |
| Polymer (A) (parts by mass) | 24 | 24 | 30 | 30 |
| Acid value of polymer (A) | 145 | 145 | 145 | 145 |
| Mass ratio [polymer (A)/pigment] | 0.2 | 0.2 | 0.2 | 0.2 |
| Step 1 | | | | |
| Water-soluble organic solvent | DEG | DEG | TEG | TEG |
| Water-soluble organic solvent (parts by mass) | 52 | 52 | 95 | 95 |
| KOH amount (parts by mass) | 10 | 10 | 19 | 19 |
| Step 2 | | | | |
| Dispersion medium: 1st addition (parts by mass) | water = 360 | water = 360 | water = 450 | water = 450 |
| Dispersion medium: 2nd addition (parts by mass) | DEG:water = 68/166 | DEG:water = 68/160 | TEG:water = 55/186 | TEG:water = 55/186 |
| Volume average particle diameter (nm) of aqueous pigment dispersion | 77 | 75 | 70 | 71 |
| Number of coarse particles of 0.5 μm or more ($\times 10^8$/mL) | 3 | 4 | 3 | 3 |
| Ejectability | A | A | A | A |
| Storage stability | A | A | A | A |

TABLE 5

| Green | Comparative Example 1 | Comparative Example 2 | Comparative Example 3 | Comparative Example 4 | Comparative Example 5 |
|---|---|---|---|---|---|
| Method for producing aqueous pigment dispersion | Y1 | Y1 | Y1 | Y2 | Y3 |
| Pigment | PG.36 | PG.7 | PG.58 | PG.36 | PG.36 |
| Pigment (parts by mass) | 150 | 150 | 150 | 150 | 150 |
| Pigment derivative | — | — | — | — | phthalocyanine-based derivative |
| Pigment derivative (parts by mass) | — | — | — | — | 7 |
| Polymer (A) | PH-1 | PH-1 | PH-1 | PH-1 | PH-1 |
| Polymer (A) (parts by mass) | 45 | 45 | 45 | 30 | 30 |
| Acid value of polymer (A) | 185 | 185 | 185 | 185 | 185 |
| Mass ratio [polymer (A)/pigment] | 0.3 | 0.3 | 0.3 | 0.2 | 0.2 |
| Step 1 | | | | | |
| Water-soluble organic solvent | TEG | TEG | TEG | TEG | TEG |
| Water-soluble organic solvent (parts by mass) | 95 | 95 | 95 | 95 | 95 |
| KOH amount (parts by mass) | 24 | 24 | 24 | 16 | 16 |
| Step 2 | | | | | |
| Dispersion medium: 1st addition (parts by mass) | water = 450 | water = 450 | water = 450 | water = 450 | water = 450 |
| Dispersion medium: 2nd addition (parts by mass) | TEG:water = 55/181 | TEG:water = 55/181 | TEG:water = 55/181 | TEG:water = 55/204 | TEG:water = 55/197 |
| Volume average particle diameter (nm) of aqueous pigment dispersion | 85 | 130 | 88 | 90 | 88 |
| Number of coarse particles of 0.5 μm or more (×10$^8$/mL) | fail 120 | fail 210 | fail 130 | fail 130 | fail 120 |
| Ejectability | C | C | C | C | C |
| Storgae stability | C | C | C | C | C |

The abbreviations in the tables are as follows.

PG.36: The abbreviation for C.I. Pigment Green 36 that is "FASTOGEN Green 2YK-MJ/."

PG.7: "FASTOGEN Green S-K" manufactured by DIC Corporation that is a mixture of at least 90% of C.I. Pigment Green 7 and 1 to 5% of C.I. Pigment Green 36.

PG.58: The abbreviation for C.I. Pigment Green 58 that is "FASTOGEN Green A110."

KOH: 34% Aqueous potassium hydroxide solution

DEG: Diethylene glycol

TEG: Triethylene glycol

Water: Ion exchanged water

In the green aqueous pigment dispersions in Examples 1 to 12 using the polymers (A), the number of coarse particles having a volume average particle diameter of more than 0.5 μm did not exceed 100×10$^8$/mL, and the inks obtained using the aqueous pigment dispersions were excellent in ejectability and storage stability. However, in the green aqueous pigment dispersions in Comparative Examples 1 to 5, the number of coarse particles exceeded 100×10$^8$/mL, and the ejectability and storage stability of the inks using these green aqueous pigment dispersions were poor.

<Method (X4) for Producing Aqueous Pigment Dispersion Using Atmospheric Pressure Kneader>

Step 1 was performed. Specifically, a 0.2 L atmospheric pressure kneader (manufactured by Advance Co., Ltd.) was charged with 120 parts by mass of the diketopyrrolopyrrole pigment and 36 parts by mass of one of P-6, P-13, and P-14, i.e., the polymers (A) obtained by the above-described methods, and mixing was performed at a jacket temperature of 80° C. (blade rotation speed: 40 rpm). Then 52 parts by mass of diethylene glycol used as the water-soluble solvent and 15 parts by mass of a 34 mass % aqueous potassium hydroxide solution used as the basic compound were added, and kneading was performed for 1 hour.

Next, step 2 was performed. Specifically, 360 parts by mass of ion exchanged water was gradually added to the kneaded product in the container under continuous stirring, and then a solution mixture of 68 parts by mass of diethylene glycol and ion exchanged water (the amount of the ion exchanged water was adjusted such that the total amount of the ion exchanged water and the 34 mass % aqueous potassium hydroxide solution added previously was 164 parts by mass) was added and mixed. An aqueous pigment dispersion with a pigment concentration of 15.0% by mass was thereby obtained.

<Method (X5) for Producing Aqueous Pigment Dispersion Using Atmospheric Pressure Kneader>

Step 1 was performed. Specifically, a 0.2 L atmospheric pressure kneader (manufactured by Advance Co., Ltd.) was charged with 120 parts by mass of the diketopyrrolopyrrole pigment, 6 parts by mass of a quinacridone-based derivative, and 36 parts by mass of P-13, i.e., a polymer (A) obtained by one of the above methods, and mixing was performed at a jacket temperature of 80° C. (blade rotation speed: 40 rpm). Then 52 parts by mass of diethylene glycol used as the water-soluble solvent and 15 parts by mass of a 34 mass % aqueous potassium hydroxide solution used as the basic compound were added, and kneading was performed for 1 hour.

Next, step 2 was performed. Specifically, 360 parts by mass of ion exchanged water was gradually added to the kneaded product in the container under continuous stirring, and then a solution mixture of 68 parts by mass of diethylene glycol and ion exchanged water (the amount of the ion exchanged water was adjusted such that the total amount of the ion exchanged water and the 34 mass % aqueous potassium hydroxide solution added previously was 158 parts by mass) was added and mixed. An aqueous pigment dispersion with a pigment concentration of 15.0% by mass was thereby obtained.

<Method (Y4) for Producing Aqueous Pigment Dispersion Using Intensive Mixer>

Step 1 was performed. Specifically, a 1.0 L intensive mixer (Nippon Eirich Co., Ltd.) was charged with 150 parts by mass of the diketopyrrolopyrrole pigment, 45 parts by mass of one of P-6, P-13, and P-14, i.e., the polymers (A) obtained by the above-described methods, or PH-1 obtained in the Comparative Synthesis Example, 95 parts by mass of triethylene glycol used as the water-soluble organic solvent, and 19 or 24 parts by mass of a 34 mass % aqueous potassium hydroxide solution, and then the mixture was kneaded at a rotor peripheral speed of 2.94 m/s and a pan peripheral speed of 1 m/s for 25 minutes.

Next, step 2 was performed. Specifically, 450 parts by mass of ion exchanged water was gradually added to the kneaded product in the container of the intensive mixer under continuous stirring, and a solution mixture of 55 parts by mass of triethylene glycol used as the water-soluble solvent and ion exchanged water (the amount of the ion exchanged water was adjusted such that the total amount of the ion exchanged water and the 34 mass % aqueous potassium hydroxide solution added previously was 198 parts by mass) was added and mixed. An aqueous pigment dispersion with a pigment concentration of 15.0% by mass was thereby obtained.

TABLE 6

| Red | Example 13 | Example 14 | Example 15 | Example 16 | Example 17 | Example 18 | Example 19 | Example 20 |
|---|---|---|---|---|---|---|---|---|
| Method for producing aqueous pigment dispersion | X4 | X4 | X4 | Y4 | Y4 | Y4 | Y4 | Y4 |
| Pigment | PR.254 | PR.254 | PR.254 | PR.254 | PR.254 | PR.254 | PR.255 | PO.71 |
| Pigment (parts by mass) | 120 | 120 | 120 | 150 | 150 | 150 | 150 | 150 |
| Polymer (A) | P-6 | P-13 | P-14 | P-6 | P-13 | P-14 | P-13 | P-13 |
| Polymer (A) (parts by mass) | 36 | 36 | 36 | 45 | 45 | 45 | 45 | 45 |
| Acid value of polymer (A) | 145 | 145 | 148 | 145 | 145 | 148 | 145 | 145 |
| Mass ratio [polymer (A)/pigment] | 0.3 | 0.3 | 0.3 | 0.3 | 0.3 | 0.3 | 0.3 | 0.3 |
| Step 1 | | | | | | | | |
| Water-soluble organic solvent | DEG | DEG | DEG | TEG | TEG | TEG | TEG | TEG |
| Water-soluble organic solvent (parts by mass) | 52 | 52 | 52 | 95 | 95 | 95 | 95 | 95 |
| KOH amount (parts by mass) | 15 | 15 | 15 | 19 | 19 | 19 | 19 | 19 |
| Step 2 | | | | | | | | |
| Dispersion medium: 1st addition (parts by mass) | water = 360 | water = 360 | water = 360 | water = 450 | water = 450 | water = 450 | water = 450 | water = 450 |
| Dispersion medium: 2nd addition (parts by mass) | DEG:water = 68/149 | DEG:water = 68/144 | DEG:water = 68/149 | TEG:water = 55/186 | TEG:water = 55/186 | TEG:water = 55/186 | TEG:water = 55/186 | TEG:water = 55/186 |
| Volume average particle diameter (nm) of aqueous pigment dispersion | 131 | 135 | 130 | 132 | 133 | 135 | 140 | 145 |
| Number of coarse particles of 0.5 μm or more (×10$^8$/mL) | 10 | 11 | 10 | 10 | 15 | 9 | 24 | 30 |
| Ejectability | A | A | A | A | A | A | A | A |
| Storage stability | A | A | A | A | A | A | B | B | by mass of triethylene glycol used as the water-soluble solvent and ion exchanged water (the amount of the ion exchanged water was adjusted such that the total amount of the ion exchanged water and the 34 mass % aqueous potassium hydroxide solution added previously was 205 parts by mass) was added and mixed. An aqueous pigment dispersion with a pigment concentration of 15.0% by mass was thereby obtained.

<Method (Y5) for Producing Aqueous Pigment Dispersion Using Intensive Mixer>

Step 1 was performed. Specifically, a 1.0 L intensive mixer (Nippon Eirich Co., Ltd.) was charged with 150 parts by mass of the diketopyrrolopyrrole pigment, 7 parts by mass of a quinacridone-based derivative, 45 parts by mass of P-13, i.e., a polymer (A) obtained by one of the above methods, or PH-1 obtained in the Comparative Synthesis Example, 95 parts by mass of triethylene glycol used as the water-soluble organic solvent, and 19 or 24 parts by mass of a 34 mass % aqueous potassium hydroxide solution, and then the mixture was kneaded at a rotor peripheral speed of 2.94 m/s and a pan peripheral speed of 1 m/s for 25 minutes.

Next, step 2 was performed. Specifically, 450 parts by mass of ion exchanged water was gradually added to the kneaded product in the container of the intensive mixer under continuous stirring, and a solution mixture of 55 parts by mass of triethylene glycol used as the water-soluble solvent and ion exchanged water (the amount of the ion exchanged water was adjusted such that the total amount of the ion exchanged water and the 34 mass % aqueous potassium hydroxide solution added previously was 198 parts by mass) was added and mixed. An aqueous pigment dispersion with a pigment concentration of 15.0% by mass was thereby obtained.

TABLE 7

| Red | Example 21 | Example 22 |
|---|---|---|
| Method for producing aqueous pigment dispersion | X5 | Y5 |
| Pigment | PR.254 | PR.254 |
| Pigment (parts by mass) | 120 | 150 |
| Pigment derivative | quinacridone-based derivative | quinacridone-based derivative |
| Pigment derivative (parts by mass) | 6 | 7 |
| Polymer (A) | P-13 | P-13 |
| Polymer (A) (parts by mass) | 36 | 45 |
| Acid value of polymer (A) | 145 | 145 |
| Mass ratio [polymer (A)/pigment] | 0.3 | 0.3 |

TABLE 7-continued

| Red | Example 21 | Example 22 |
|---|---|---|
| Step 1 | | |
| Water-soluble organic solvent | DEG | TEG |
| Water-soluble organic solvent (parts by mass) | 52 | 95 |
| KOH amount (parts by mass) | 15 | 19 |
| Step 2 | | |
| Dispersion medium: 1st addition (parts by mass) | water = 360 | water = 450 |
| Dispersion medium: 2nd addition (parts by mass) | DEG:water = 68/143 | TEG:water = 55/179 |
| Volume average particle diameter (nm) of aqueous pigment dispersion | 130 | 130 |
| Number of coarse particles of 0.5 μm or more ($\times 10^8$/mL) | 11 | 9 |
| Ejectability | A | A |
| Storage stability | A | A |

TABLE 8

| Red | Comparative Example 6 | Comparative Example 7 | Comparative Example 8 | Comparative Example 9 | Comparative Example 10 |
|---|---|---|---|---|---|
| Method for producing aqueous pigment dispersion | Y4 | Y4 | Y4 | X5 | Y5 |
| Pigment | PR.254 | PR.255 | PO.71 | PR.254 | PR.254 |
| Pigment (parts by mass) | 150 | 150 | 150 | 120 | 150 |
| Pigment derivative | — | — | — | quinacridone-based derivative | quinacridone-based derivative |
| Pigment derivative (parts by mass) | — | — | — | 6 | 7 |
| Polymer (A) | PH-1 | PH-1 | PH-1 | PH-1 | PH-1 |
| Polymer (A) (parts by mass) | 45 | 45 | 45 | 36 | 45 |
| Acid value of polymer (A) | 145 | 145 | 145 | 145 | 145 |
| Mass ratio [polymer (A)/pigment] | 0.3 | 0.3 | 0.3 | 0.3 | 0.3 |
| Step 1 | | | | | |
| Water-soluble organic solvent | TEG | TEG | TEG | DEG | TEG |
| Water-soluble organic solvent (parts by mass) | 95 | 95 | 95 | 52 | 95 |
| KOH amount (parts by mass) | 19 | 19 | 19 | 15 | 19 |
| Step 2 | | | | | |
| Dispersion medium: 1st addition (parts by mass) | water = 450 | water = 450 | water = 450 | water = 360 | water = 450 |
| Dispersion medium: 2nd addition (parts by mass) | TEG:water = 55/186 | TEG:water = 55/186 | TEG:water = 55/186 | DEG:water = 68/143 | TEG:water = 55/179 |
| Volume average particle diameter (nm) of aqueous pigment dispersion | 150 | 170 | 165 | 130 | 130 |
| Number of coarse particles of 0.5 μm or more ($\times 10^8$/mL) | fail 150 | fail 220 | fail 130 | fail 145 | fail 143 |
| Ejectability | C | C | C | C | C |
| Storage stability | C | C | C | C | C |

The abbreviations in the tables are as follows.
PR.254: The abbreviation for C.I. Pigment Red 254 that is "Irgagin Red L 3630."
PR.255: The abbreviation for C.I. Pigment Red 255 that is "Irgagin DPP Scarlet EK."
PO.71: The abbreviation for C.I. Pigment Orange 71 that is "Cromophtal DPP Orange TR."
KOH: 34% Aqueous potassium hydroxide solution
DEG: Diethylene glycol
TEG: Triethylene glycol
Water: Ion exchanged water
In the red aqueous pigment dispersions in Examples 13 to 22 using the polymers (A), the number of coarse particles having a volume average particle diameter of more than 0.5 μm did not exceed $100 \times 10^8$/mL, and the inks obtained using the aqueous pigment dispersions were excellent in ejectability and storage stability. However, in the red aqueous pigment dispersions in Comparative Examples 6 to 10, the number of coarse particles exceeded $100 \times 10^8$/mL, and the ejectability and storage stability of the inks using these red aqueous pigment dispersions were poor.

BRIEF DESCRIPTION OF DRAWING

FIG. 1 is a schematic diagram of the microreactor used in the present invention.

REFERENCE SIGNS LIST

1: T-shaped micromixer M1
2: T-shaped micromixer M2
3: T-shaped micromixer M3
4: tube reactor R1
5: tube reactor R2
6: tube reactor R3
7: tube reactor P1 for precooling
8: tube reactor P2 for precooling
9: tube reactor P3 for precooling
10: tube reactor P4 for precooling

The invention claimed is:
1. An aqueous pigment dispersion comprising: a polymer (A) that has anionic groups, has a solubility in water of 0.1 g/100 mL or less and a number average molecular weight within the range of 1,000 to 6,000, and forms fine particles in water when the degree of neutralization of the anionic groups with a basic compound is 100%; a polyhalogenated metal phthalocyanine pigment or a diketopyrrolopyrrole pigment; and water, wherein the polymer (A) is represented by general formula (1):

[Chem. 1]

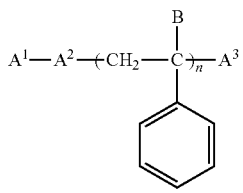

(1)

wherein, in general formula (1), $A^1$ represents an organic lithium initiator residue; $A^2$ represents a polymer block of a monomer having an aromatic ring or a heterocycle; $A^3$ is a polymer block having anionic groups; n represents an integer of 1 to 5; and B represents an aromatic group or an alkyl group.

2. The aqueous pigment dispersion according to claim 1, wherein the polymer (A) has an acid value within the range of 40 to 400 mg KOH/g.

3. The aqueous pigment dispersion according to claim 1, wherein the polymer (A) is represented by general formula (1):

[Chem. 2]

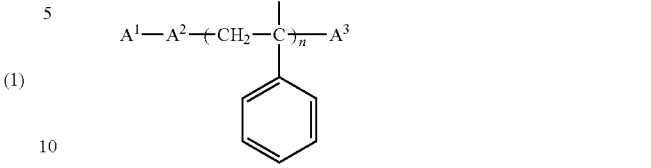

(1)

wherein, in general formula (1), $A^1$ represents an organic lithium initiator residue; $A^2$ represents a polymer block of a styrene-based monomer and/or a monomer having a nitrogen atom-containing heterocycle; $A^3$ is a polymer block in which some or all units thereof each have an anionic group, the anionic group originating from a monomer containing a (meth)acrylate having a protecting group that is reconvertible into the anionic group, the anionic group being obtained by reconverting the protecting group by deprotection; B represents an aromatic group or an alkyl group; and n represents an integer of 1 to 5.

4. The aqueous pigment dispersion according to claim 3, wherein the polymer (A) has an acid value within the range of 40 to 400 mg KOH/g.

5. An aqueous green or red ink for inkjet recording that uses the aqueous pigment dispersion according to claim 1.

6. An aqueous green or red ink for inkjet recording that uses the aqueous pigment dispersion according to claim 3.

7. An aqueous green or red ink for inkjet recording that uses the aqueous pigment dispersion according to claim 2.

* * * * *